(12) United States Patent
Boettcher et al.

(10) Patent No.: US 11,263,073 B2
(45) Date of Patent: Mar. 1, 2022

(54) ERROR RECOVERY FOR INTRA-CORE LOCKSTEP MODE

(71) Applicant: ARM Limited, Cambridge (GB)

(72) Inventors: Matthias Lothar Boettcher, Cambridge (GB); Mbou Eyole, Soham (GB); Balaji Venu, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/641,377

(22) PCT Filed: Aug. 30, 2018

(86) PCT No.: PCT/GB2018/052451
§ 371 (c)(1),
(2) Date: Feb. 24, 2020

(87) PCT Pub. No.: WO2019/069043
PCT Pub. Date: Apr. 11, 2019

(65) Prior Publication Data
US 2020/0192742 A1    Jun. 18, 2020

(30) Foreign Application Priority Data

Oct. 5, 2017 (GB) .................................. 1716283.5

(51) Int. Cl.
*G06F 11/07* (2006.01)
*G06F 9/22* (2006.01)

(52) U.S. Cl.
CPC .......... *G06F 11/0793* (2013.01); *G06F 9/226* (2013.01); *G06F 11/0721* (2013.01); *G06F 11/0751* (2013.01)

(58) Field of Classification Search
CPC .. G06F 11/0793; G06F 9/226; G06F 11/0721; G06F 11/0751; G06F 2201/845;
(Continued)

(56) References Cited

U.S. PATENT DOCUMENTS

2005/0108509 A1   5/2005  Safford et al.
2009/0183035 A1   7/2009  Butler et al.
(Continued)

OTHER PUBLICATIONS

International Search Report and Written Opinion of the ISA for PCT/GB2018/052451 dated Nov. 27, 2018, 16 pages.
(Continued)

*Primary Examiner* — Yair Leibovich
(74) *Attorney, Agent, or Firm* — Nixon & Vanderhye P.C.

(57) ABSTRACT

An apparatus has a processing pipeline (2) comprising an execute stage (30) and at least one front end stage (10), (20), (25) for controlling which micro operations are issued to the execute stage. The pipeline has an intra-core lockstep mode of operation in which the at least one front end stage (10), (20), (25) issues micro operations for controlling the execute stage (30) to perform main processing and checker processing. The checker processing comprises redundant operations corresponding to associated main operations of at least part of the main processing. Error handling circuitry (200), (210) is responsive to the detection of a mismatch between information associated with given checker and main operations to trigger a recovery operation to correct an error and continue forward progress of the main processing.

26 Claims, 12 Drawing Sheets

(58) Field of Classification Search
CPC .. G06F 11/165; G06F 11/1641; G06F 9/3861; G06F 9/3885; G06F 11/1497; G06F 11/1629
USPC .......................................................... 714/10
See application file for complete search history.

(56) References Cited

U.S. PATENT DOCUMENTS

2010/0268987 A1   10/2010  Clark et al.
2015/0301827 A1*  10/2015  Sideris .................. G06F 1/3243
                                                                             712/226
2017/0185465 A1    6/2017  Ould-Ahmed-Vall et al.

OTHER PUBLICATIONS

Combined Search and Examination Report for GB1716283.5 dated Mar. 26, 2018, 7 pages.
Chen et al., "Software fault tolerance for FPUs via vectorization", 2015 International Conference on Embedded Computer Systems: Architectures, Modeling and Simulation (SAMOS), Jul. 19, 2015, pp. 203-210.

* cited by examiner

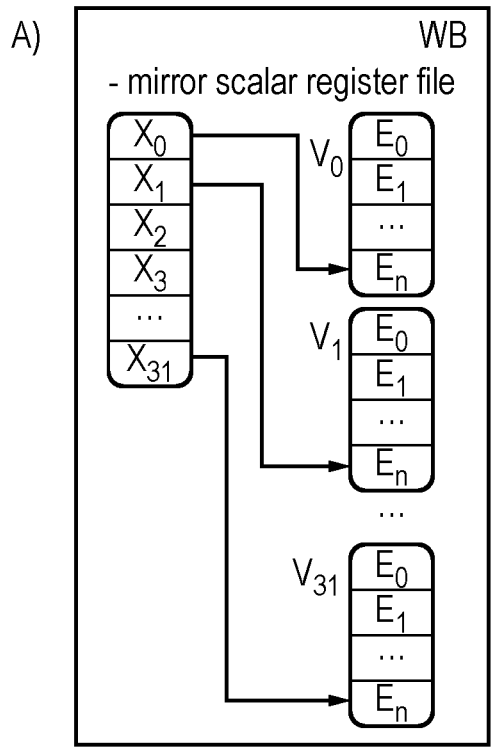
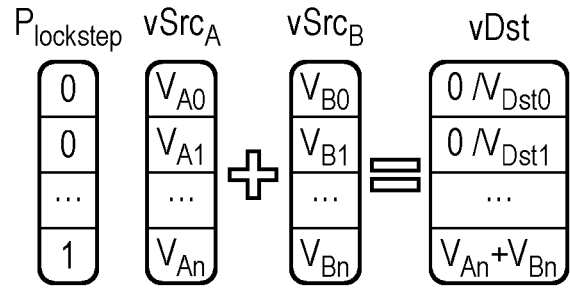
FIG. 2

C code example

```
total = 0;
for (i = 10; i > 0; i--) {
    total += i;
}
``` assembly code

```
       MOV  R0, #0    ; R0 accumulates total
       MOV  R1, #10   ; R1 counts down from 10
loop
       ADD  R0, R0, R1
       SUBS R1, R1, #1
       BNE  loop
       ...
       STR  R0, <dst>
``` compiled assembly including lockstep integration

```
      < init. P0 (once) > ;Lockstep predicate
      MOV  R0, #0          ; R0 accumulates total
      vDUP V0, #0, P0      ; V0[n] accumulates total
      MOV  R1, #10         ; R1 counts down from 10
      vDUP V1, #10, P0     ; V1 counts down from 10
loop
      ADD  R0, R0, R1
      vADD V0, V0, V1, P0
      SUBS R1, R1, #1
      vSUB V1, V1, #1, P0
      < optional check of R1 against V1 >
      BNE  loop
      ...
      vDUP Vx, R0, P0      ;Helper vector to hold R0
      VCMP V0, Vx, P0
      BNE  fault_detected
      STR  R0, <dst>
```

FIG. 5

ERROR RECOVERY FOR INTRA-CORE LOCKSTEP MODE

This application is the U.S. national phase of International Application No. PCT/GB2018/052451 filed Aug. 30, 2018 which designated the U.S. and claims priority to GB Patent Application No. 1716283.5 filed Oct. 5, 2017, the entire contents of each of which are hereby incorporated by reference.

The present technique relates to the field of data processing. More particularly, it relates to correction of errors.

Data processing apparatuses may be subject to random hardware faults, e.g. permanent faults caused by a short circuit or a broken via in an integrated circuit, or temporary faults such as bit flips caused by exposure to natural radiation or particle strikes. For some fields of use, e.g. in the automotive field where safety can be critical, to ensure functional safety a processor can be provided with error detection mechanisms for detecting errors and ensuring safe operation in the presence of such errors.

At least one example provides an apparatus comprising:
a processing pipeline comprising an execute stage to execute data processing in response to micro-operations, and at least one front end stage to control which micro-operations are issued to the execute stage in dependence on program instructions;
said processing pipeline having an intra-core lockstep mode of operation in which said at least one front end stage is configured to issue micro-operations for controlling the execute stage to perform main processing and checker processing, the checker processing comprising redundant operations corresponding to associated main operations of at least part of the main processing; and
error handling circuitry responsive to detection of a mismatch between information associated with a given checker operation and an associated main operation, to trigger a recovery operation to correct an error and continue forward progress of said main processing on said execute stage.

At least one example provides a data processing method comprising:
executing data processing using an execute stage of a processing pipeline, in response to micro-operations issued in dependence on program instructions by at least one front end stage of the processing pipeline;
wherein in an intra-core lockstep mode of operation, said at least one front end stage issues micro-operations for controlling the execute stage to perform main processing and checker processing, the checker processing comprising redundant operations corresponding to associated main operations of at least part of the main processing; and
in response to detection of a mismatch between information associated with a given checker operation and an associated main operation, triggering a recovery operation to correct an error and continue forward progress of said main processing on said execute stage.

Further aspects, features and advantages of the present technique will be apparent from the following description of examples, which is to be read in conjunction with the accompanying drawings, in which:

FIG. 1 schematically illustrates an example of a data processing system including scalar processing circuitry and vector processing circuitry;

FIG. 2 schematically illustrates use of a lane of the vector processing circuitry for checking errors in scalar processing performed by the scalar processing circuitry;

FIG. 5 shows an example illustrating the generation of the compiled code;

Figure 8:
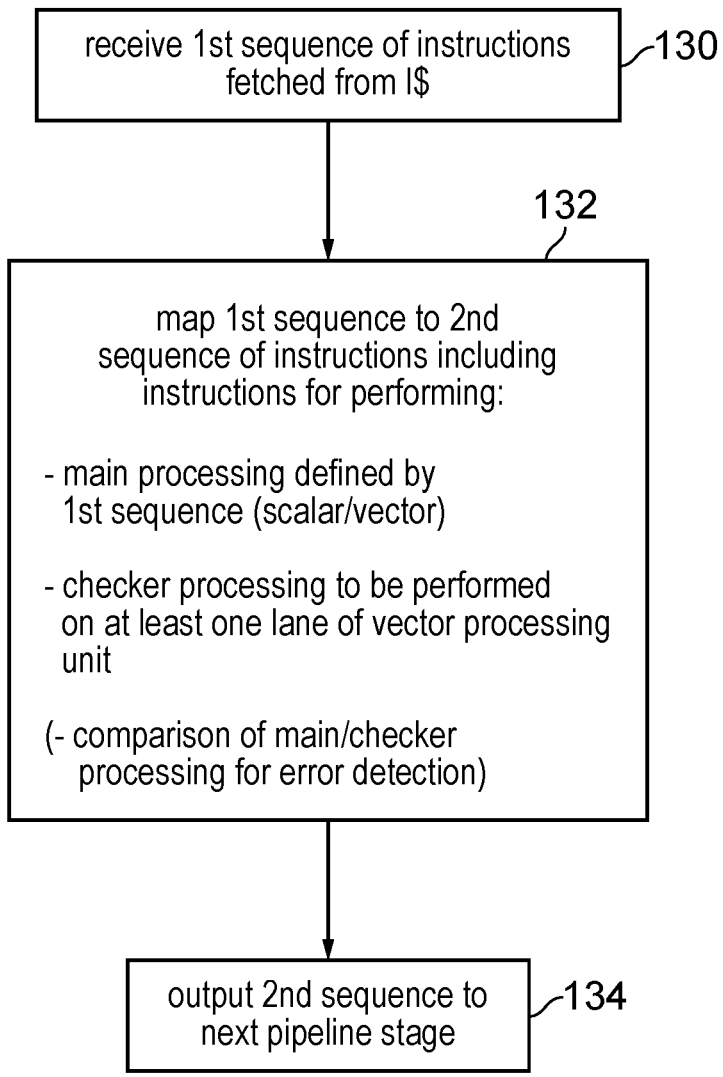
Figure 9:
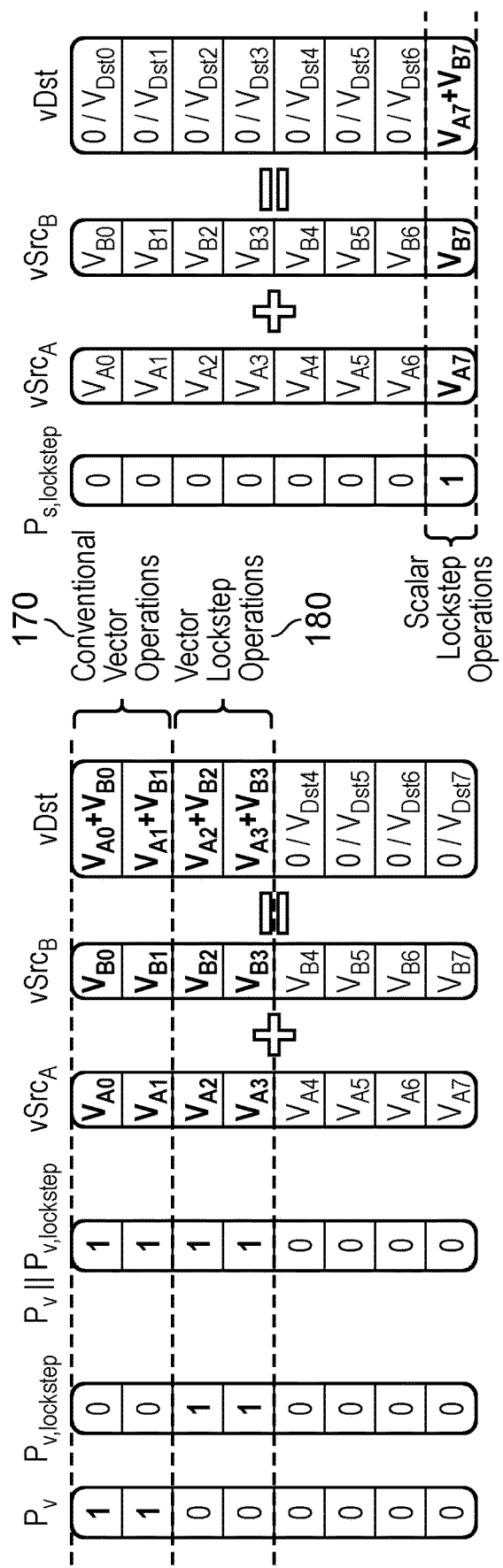

FIG. 8 shows a method for an instruction decoder to generate instructions for performing the checker processing; and FIG. 9 shows an example where the main processing is vector processing performed on a subset of lanes of the vector processing circuitry, and the checker processing is executed on a further subset of lanes of the vector processing circuitry, and also shows an example of executing scalar lockstep operations on the vector processing circuitry.

Figure 10:
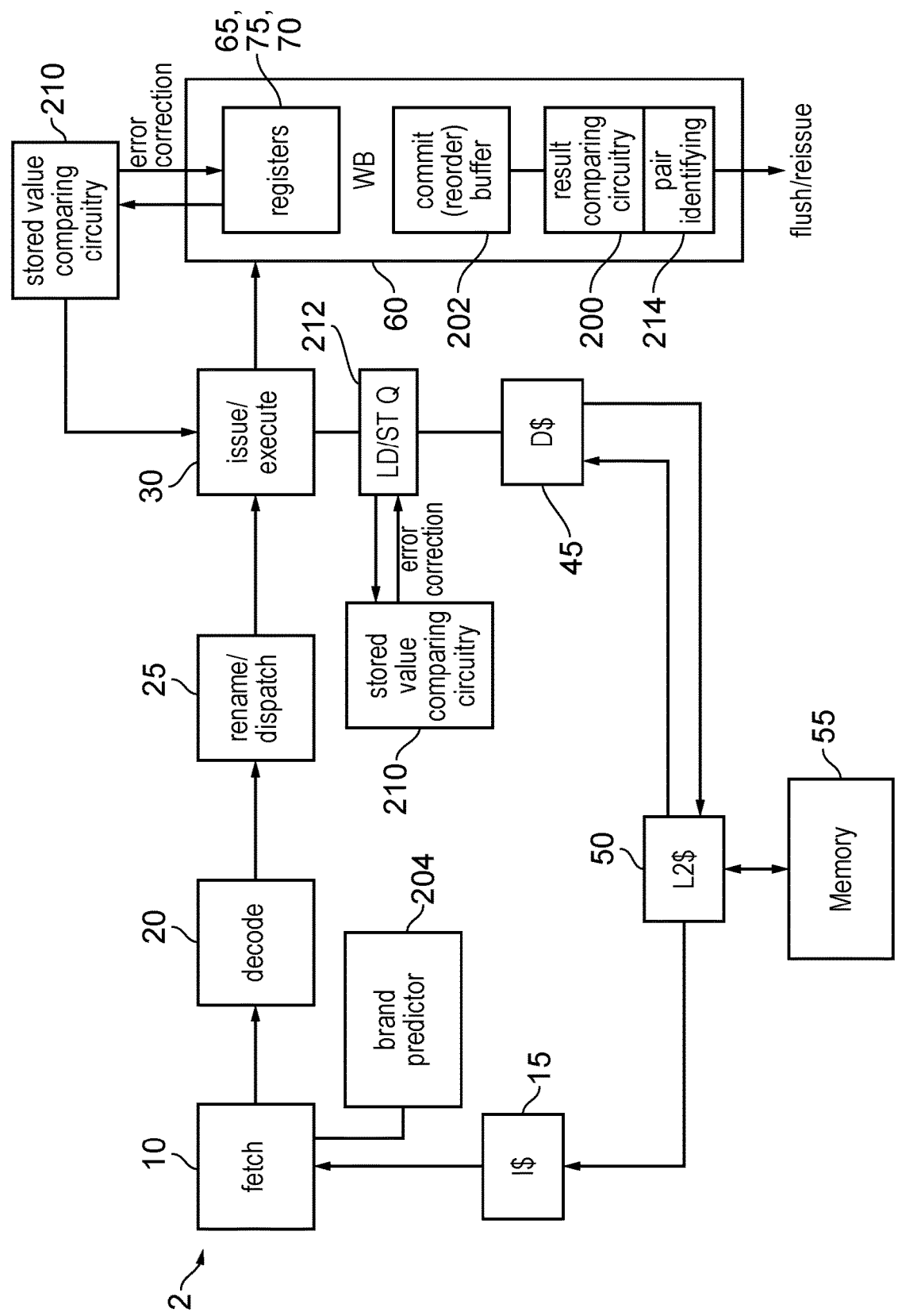
Figure 11:
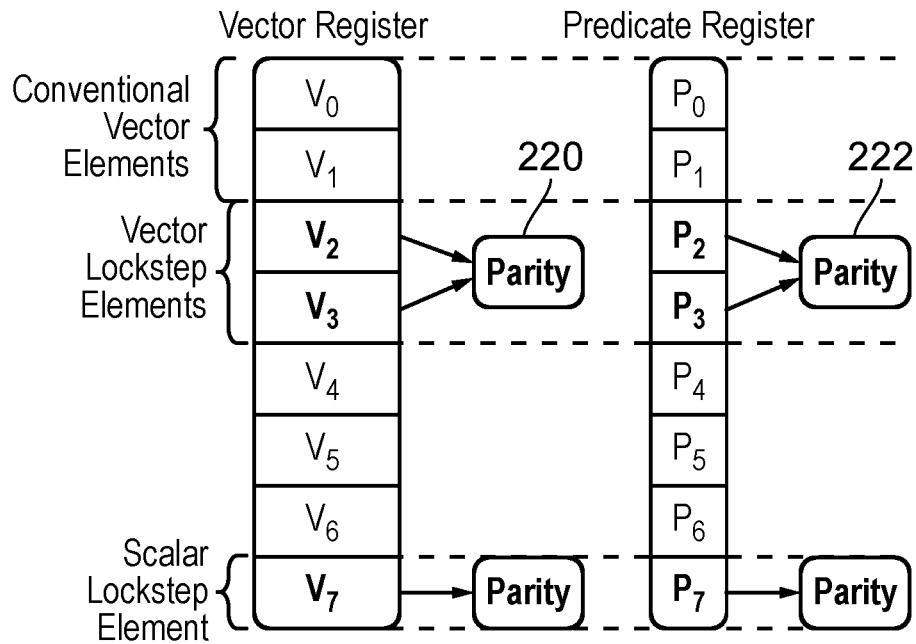
Figure 12:
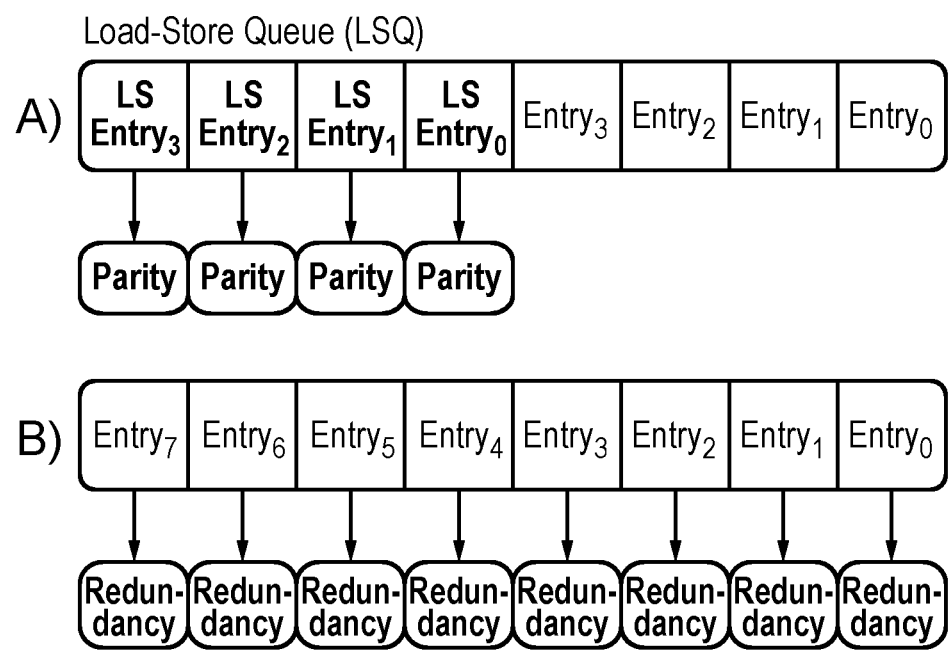
Figure 13:
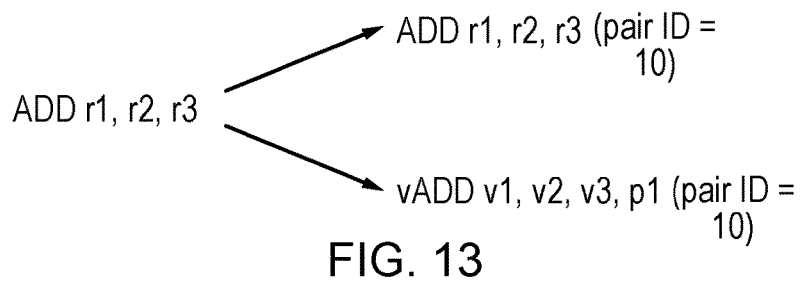
Figure 14:
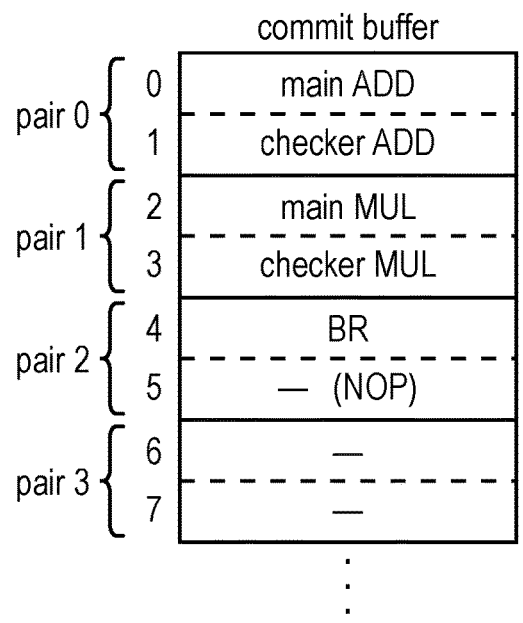
Figure 15:
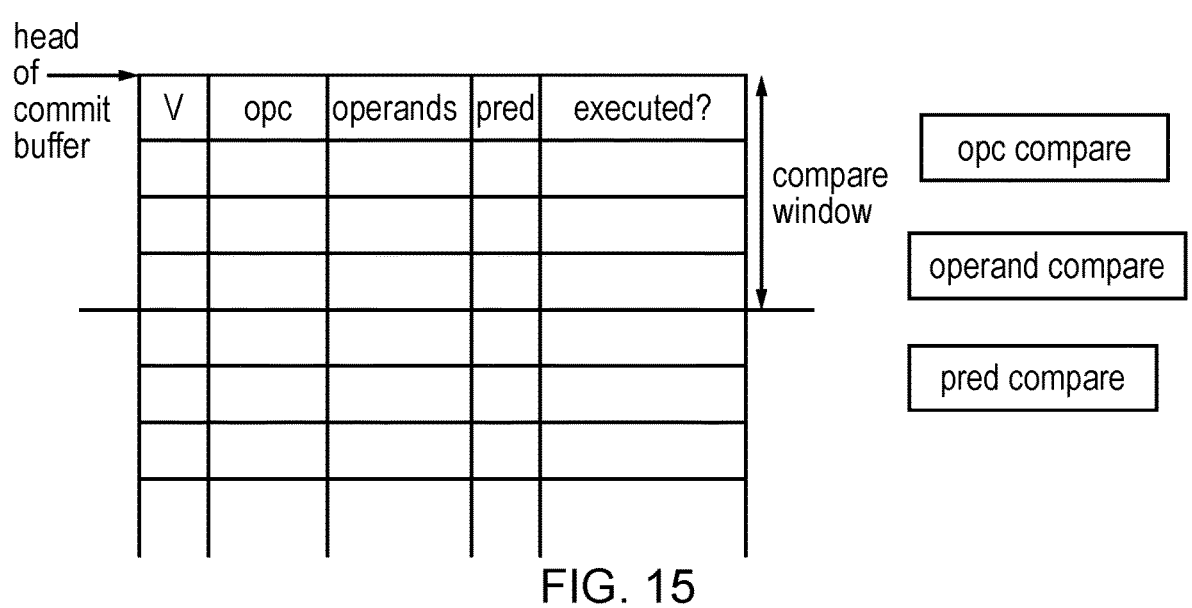
Figure 16:
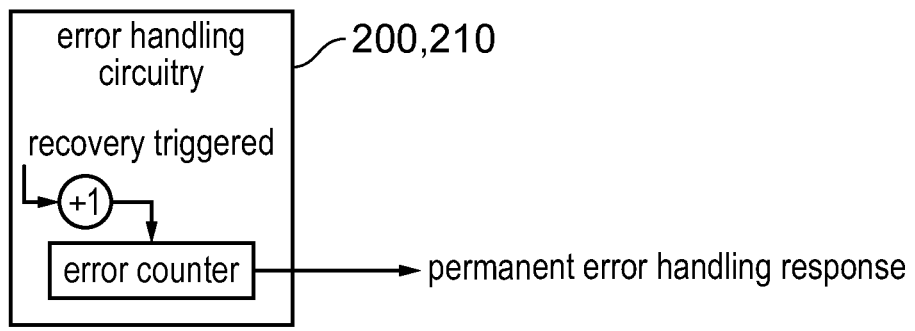
Figure 17:
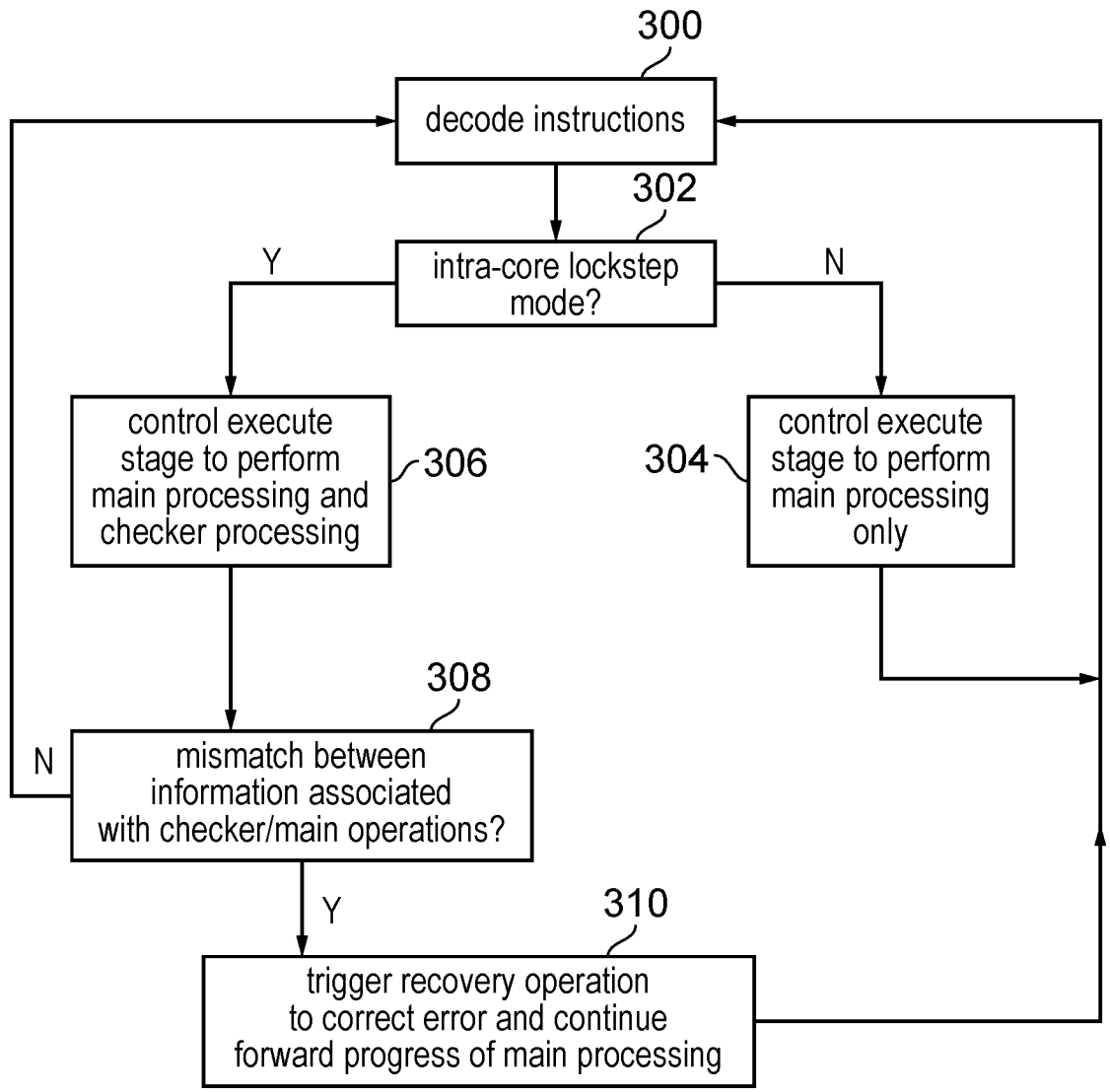

FIG. 10 illustrates an example of a pipeline supporting an intra-core lockstep mode where error handling circuitry is provided to perform a recovery operation to correct detected errors and continue forward progress of the main processing;

FIG. 11 shows an example of using error detecting codes to detect and correct errors in stored data values;

FIG. 12 shows examples of using error detecting or correcting codes to recover from errors in stored values in queue structures;

FIGS. 13, 14 and 15 illustrate three example techniques for tracking which micro-operations relate to a corresponding pair of main and checker operations;

FIG. 16 shows an example of using an error counter to detect when an error is an unrecoverable error; and FIG. 17 is a flow diagram showing a method of performing recovery from errors detected in the intra-core lockstep mode.

A processing pipeline may have an execute stage for executing data processing in response to micro-operations, and at least one front end stage to control which micro-operations are issued to the execute stage in dependence on program instructions. The pipeline may support an intra-core lockstep mode of operation in which the at least one front end stage issues micro-operations for controlling the execute stage to perform main processing and checker processing. The checker processing comprises redundant operations which correspond to associated main operations of at least part of the main processing. Providing for such redundant processing within a pipeline can provide a more area and energy efficient technique for providing fault tolerance than is possible with a conventional lockstep approach where the entire processor core is duplicated and identical programs are executed on each processor core.

Error handling circuitry may be provided which is responsive to detection of a mismatch between information associated with a given checker operation and an associated main operation, to trigger a recovery operation to correct an error and continue forward progress of the main processing on the execute stage of the pipeline. The design, implementation and logic verification involved in developing a processor micro-architecture for a modern micro-processor is relatively labour intensive, and so once a particular micro-architecture has been developed and verified, there is often extreme reluctance to make changes to the micro-architecture. Typically, providing fault tolerance or error correction functionality has been regarded as an add-on which is added alongside the existing micro-architecture rather than being built into the original design. Therefore, lockstep approaches which provide redundancy for enabling detection or correction of errors rely on either duplicating an existing micro-architectural design (such as in the physical lockstep examples where an entire processor core is duplicated), or rely on software redundancy where a pre-developed micro-architectural design is used and the redundancy is provided solely by providing different sets of instructions for execution on the pipeline. Either way, this allows existing pipeline micro-architectures to be used without modification. However, this approach means that if an error is detected in a pipeline which is executing main processing and checker processing, as the pipeline would generally be designed to commit the results of either the main processing or the checker processing as soon as they are ready, then it can be relatively difficult to recover from errors without aborting the main processing being performed (e.g. terminating the thread being executed), losing any previous progress that has been made during execution of the thread and incurring a significant delay as other operations (e.g. an interrupt handler or operating system scheduler) may be executed after termination of the thread before the thread can be rescheduled.

In contrast, the inventors recognised that with some micro-architectural modifications to the processing pipeline, it is possible to provide error handling circuitry which responds to detection of a mismatch between the information associated with the corresponding main and checker operations, to trigger a recovery operation which corrects an error and continues forward progress of the main processing on the execute stage of the pipeline. Hence this avoids the need to terminate the main processing and enables at least some of the previous progress that has been made in the main processing to be preserved. This allows for recovery of errors significantly faster than if the main processing was aborted and restarted from the beginning.

The error handling circuitry may have various forms. In one example the error handling circuitry may comprise result comparing circuitry to detect the mismatch between results of the given checker operation and the associated main operation. This can be used for detecting errors which arise in the data path of the execute stage, which could lead to incorrect results even if the input operands for the operations were correct.

The recovery operation may comprise flushing from the processing pipeline at least one in-flight micro-operation which corresponds to, or is dependent on, the given checker operation and the associated main operation for which the mismatch was detected. The flushed in-flight micro-operations can be reissued for execution by the execute stage in order to correct the error. Hence, if the error was in the data path but the input operands in the register file were correct, then flushing and reissuing some instructions can be enough to correct the error and enable continued forward progress of the main processing in the execute stage. In some cases, only the micro-operations which are affected by the error could be flushed. For example the error handling circuitry could detect micro-operations which either correspond to the erroneous checker operation and associated main operation which were mismatching themselves, or which are dependent on the erroneous checker and main operations, and could then flush and reissue only those affected micro-operations. In other implementations, the complexity of identifying which particular operations are affected by the error may not be justified. Instead, it is possible to simply flush all in-flight micro-operations from the processing pipeline and reissue the flushed micro-operations for execution by the execute stage, without checking which micro-operations are actually dependent on the erroneous checker and main operations.

The processing pipeline may have a writeback stage which defers writeback of a result of the given checker operation or the associated main operation to register state storage until both the given checker operation and the associated main operation have been executed and the results of the given checker operation and associated main operation are determined to match. This ensures that a potentially erroneous micro-operation is not allowed to pollute the register state until it has been compared against its corresponding redundant operation and determined to be correct. This preserves the validity of the register state in the register file as it avoids errors occurring in the data path affecting the register state, and hence this allows errors in the data path to be corrected simply by flushing and reissuing some micro-operations. This feature is unusual because in typical pipelines each micro-operation's result is committed as soon as it is ready to commit (which typically depends on whether earlier micro-operations on which the micro-operation has an operand dependency have committed), without needing to pair the commitment of a given operation with another independent operation not having such an operand dependency. However, while some micro-architectural modifications to the pipeline may be required in order to couple the writeback of the given checker operation and its associated main operation, such modifications are justified as this enables much faster recovery from errors.

In order to support the deferred write back of the given checker operation and the associated main operation until both results are ready and determined to match, the writeback stage may have a pair identifying circuitry for identifying which pair of micro-operations correspond to the related checker and main operations. There are a number of techniques which can be used to implement such pair identifying circuitry.

In one example, the at least one front end stage may allocate a pair identifier to micro-operations which are issued to the execute stage. Micro-operations corresponding to the given checker operation and the associated main operation may be allocated the same pair identifier. For example, the pair identifier allocation could be done in a decode stage within the front end part of the pipeline. The pair identifying circuitry in the writeback stage can then identify a pair of related main and character operations based on the matching pair identifiers. This approach has the advantage that it is relatively simple for the writeback stage to identify which micro-operations are related, and also enables a commit buffer within the writeback stage for buffering in-flight micro-operations awaiting writeback to be used to its full capacity without imposing any limitations on which micro-operations can be allocated to which buffer entries.

Alternatively, the processing pipeline may comprise a commit buffer with a number of pairs of buffer slots, with each buffer slot to buffer an in-flight micro-operation until its result is written back to the registered state storage by the writeback stage. The processing pipeline may allocate the micro-operations which correspond to the given checker operation and its associated main operation to the same pair of buffer slots. Hence, with this approach there is no need for a decode stage or other stage in the front end of the pipeline to allocate specific pair identifiers to micro-operations. This means that it is not necessary to widen the number of bits associated with each micro-operation as it passes down the pipeline, which saves power and circuit area by reducing the number of wires required per micro-operation throughout the entire pipeline. Also, this approach is relatively simple for the writeback stage to implement, since there is no need to compare any identifiers, operands or opcodes or any other information associated with the micro-operations at the writeback stage, since the pair identifying circuitry of the writeback stage can simply determine that the operations allocated to the same pair of buffer slots are related, and so writeback of the results of those operations should be deferred until both results are available and matching. While this approach may result in some buffer slots not being fully occupied (since some main operations may not have an associated checker operation and so the second slot in a given pair of slots allocated to one of those non-replicated main operations may not be used), some additional buffer capacity can be provided to account for this, and the simplification of the writeback stage logic may justify some slots not being fully occupied. Alternatively, to enable full use of buffer capacity, each pair of slots may include an additional flag to indicate whether the pair of slots contain related main/checker operations or two unrelated main operations.

Another approach can be that the pair identifying circuitry of the writeback stage may identify micro-operations corresponding to the given checker operation and the associated main operation based on a comparison of opcodes and operand identifiers associated with the micro-operations. Hence in this case there is no need to tag the micro-operations with any particular pair identifier at the front end of the pipeline, and also the micro-operations can be freely allocated to any location within the commit buffer. Some information that distinguishes checker operations from main operations may also be used by the writeback stage to identify which micro-operations are related. For example, in an implementation where the checker operations are implemented on a vector processing unit, predicate information indicating which lanes of the vector processing are active could be used to distinguish checker operations from main operations. To limit the complexity of the comparison logic for comparing the information associated with different micro-operations to identify the related checker and main operations, in some cases the comparison may be restricted to a certain subset of micro-operations pending at the writeback stage. For example, only micro-operations within a predetermined number of entries of the head of the commit buffer could be checked.

When operating in the intra-core lockstep mode, when a load operation is performed to load data from a data store (e.g. memory) to a target register in response to the main processing, the processing pipeline may also write the loaded data to a checker region of the target register or to another register for access by the checker operation which corresponds to the main operation accessing the target register. Hence loads to the register file may be mirrored by the pipeline so that subsequent main and checker operations may read corresponding data values from different parts of the registered file in order to provide the redundancy of operation.

In some cases, only a single load transaction may be issued to the memory system in order to load the values for the main processing and the checker processing. Circuitry within the load/store unit or the register file may then replicate the loaded data value into the target register and the checker region. By reducing memory bandwidth required, this allows the intra-core lockstep mode to be implemented more efficiently in terms of performance.

Alternatively, another approach would be to replicate load operations so that separate micro-operations are issued to the pipeline for loading the values for the main processing and checker processing respectively, and hence separate load transactions are issued to the memory system, loading the data value from the same address to the main region of the target register and the checker region respectively. The separate load transactions may target the same memory region in the memory system, but load into the main and checker regions of the register file.

The error handling circuitry may also comprise stored value comparing circuitry to detect the mismatch between a pair of stored data values used for the redundant checker operation and its associated main operation respectively. For example, the stored data values can be architectural state stored in registers, or could be stored data values representing control data stored in a queue structure. This guards against errors caused by bit flips which may occur if a particle strike or exposure to radiation causes a bit within a storage structure to change state.

To enable the recovery of detected errors, at least one of the pair of stored data values checked by the error handling circuity may be associated with an error detecting code. An error detecting code may be any code which provides some redundant information which allows the occurrence of at least one bit changing state to be detected. For example, the error detecting code could be a parity code or a cyclic redundancy check (CRC) code. Although in some case the error detecting code can comprise an error correcting code which not only enables bit flips to be detected but also enables the correct value to be restored from the stored data value and the corresponding error correcting code alone, in practise the extra overhead associated with implementing error correcting codes may not be justified. This is because computation of error correcting codes can be performance and energy intensive and as the stored data values may be accessed frequently (e.g. the architectural state stored in registers may be read or updated in response to almost every instruction in the pipeline), this may result in a significant overhead. Surprisingly, error detecting codes which are capable of detecting errors but not by themselves capable of actually correcting the error in a stored value can be sufficient for supporting recovery of errors in the intra-core lockstep mode. This is because there is already redundancy in the fact that there is a pair of stored data values which should correspond to each other, one corresponding to the main operation and the other corresponding to the checker operation. This avoids the significant overhead of error correcting codes while still enabling errors to be corrected using the cheaper error detecting codes, and hence a recovery operation can be performed to enable continued forward progress of the main process being performed.

In one example, the recovery operation performed when a mismatch is detected between the pair of stored data values, may comprise correcting the erroneous stored value using the other of the pair of stored data values. This may be used if micro-operations for the main/checker operations are held back from issuing for execution until the comparisons between the main/checker values in the registers have been performed and the data is available. Alternatively, the recovery operation could comprise flushing and reissuing micro-operations as discussed above. For example, this may be preferable if the micro-operations for the main or checker operations are allowed to proceed speculatively before the outcome of the comparison of the stored data values representing input operands for the main/checker operations is available.

It is possible that some errors in stored values may be caused by a permanent fault in the storage circuitry, such as a short circuit or broken via. Hence, in some examples after the erroneous stored value is corrected, the stored value comparing circuitry may repeat the detection of whether there is a mismatch between the stored data values. If the stored data values match then this indicates that the fault was transient and has now been successfully corrected. However, if the error persists then other steps may be taken to deal with a potential permanent fault.

Also, when a match is detected between the pair of stored data values, in some cases the error handling circuitry may then simply allow the corresponding main and checker operations to proceed using the stored data values. However, in other examples, the error handling circuity may, in response to detection of a match between the stored data values, trigger recomputation of the error detecting code associated with at least one of the pair of stored data values. This allows errors which may arise in the error detecting code, rather the stored data value itself, to be corrected.

It is possible for both of the pair of stored data values to be associated with respective error detecting codes, to provide additional robustness against errors. This may allow errors in the error detecting code to be detected at the point when an error is also identifier in the corresponding data values.

However, it is not essential for both of the pair of stored data values to be associated with an error detecting code, as the likelihood of multiple bit-flip errors occurring, one in the data value and the other in the error detecting code, may be low, especially if the storage elements for holding the respective data values and error detecting code are physically separated on the integrated circuit. Hence, in some cases only one of the pair of stored data values may have the associated error detecting code, e.g. only the value used by the main operation or only the value used by the checker operation. If there is a mismatch between the two stored data values, the data value having the associated error detecting code can be determined to be correct or incorrect based on whether a recomputation of the expected error detecting code from the stored data value matches the stored error detecting code. If the stored error detecting code matches the expected error detecting code calculated from the stored data value, then this means that that data value is correct and so the error between the stored data values must lie in the other of the pair of stored data values. On the other hand, if the stored and expected error detecting codes for one of the pair of data values mismatches then the error is pinpointed to that data value. Hence, circuit overhead can be reduced by computing an error detecting code for only one of the pair of stored data values. For example, in the examples below where the checker value is stored in a portion of the vector register file and the main data value is stored either in a scaler register file or another lane of the vector register file, the error detecting codes need only be calculated for lanes of the vector register file which corresponds to checker values.

Error detecting codes could also be used for certain stored values which are not directly associated with the main and checker operations, such as load/store data related to a non-duplicated load/store instruction, or buffer data within the memory system. This provides additional fault tolerance against errors occurring in buffers. For example each buffered item could be allocated twice (or more than two times) to a buffer, with associated error detecting codes enabling detection of which stored buffer value is correct on a mismatch between the redundantly allocated buffer items. Alternatively, error correcting codes (ECCs) could be used for the buffers to avoid redundantly allocating multiple entries for one item.

As mentioned above, some errors are permanent faults caused by defects in the hardware of the processing pipeline and so may not be able to be fixed using the recovery operation. To distinguish transient faults from permanent faults, an error counter can be provided to count a number of times the recovery operation is performed by the error handling circuitry. The error handling circuitry may abort processing of the main processing on the pipeline when the error counter indicates that the recovery operation has been performed more than a threshold number of times. Hence, if errors keep arising then this may indicate that the fault is likely a permanent fault and so a more invasive response action may be required than is possible using the recovery operation which corrects errors and enables continued forward progress.

In a system comprising multiple processors, in which at least one of the processors has the processing pipeline and error handling circuitry supporting the intra-core lockstep mode and recovery operation as discussed above, the error handling circuitry may trigger switching of processing of the main processing to another processor when the error counter indicates that the recovery operation has been performed more than the threshold number of times. Hence, if a permanent fault arises on one processor then the main processing could continue on the other processor.

Alternatively, in some cases the error handling circuitry may trigger a reset of the apparatus when the error counter indicates that the recovery operation has been performed more than a threshold number of times.

The intra-core lockstep mode can be implemented in different ways. In some cases it is possible for scalar main processing to be replicated using further scalar operations performed as the checker processing. However, it can be particularly useful to provide the intra-lockstep mode in a pipeline where the execute stage comprises vector processing circuitry to perform vector processing comprising two or more lanes of processing performed on vector operands comprising two or more data elements. In this case the redundant checker operations may comprise operations performed on at least one lane of vector processing circuitry while the main operations could comprise either operations performed on other lanes of the vector processing circuitry or scalar processing performed on scalar operands by scalar processing circuitry. This exploits the fact that the vector processing circuitry often provides functionality which mirrors processing capability provided elsewhere within the execute stage, such as in other functional units or in other lanes of the vector processing circuitry, and so this provides some redundancy in hardware which can be exploited to enable redundant operations to be performed within the same device with less impact on performance.

The front end stage of the pipeline may include a number of different stages, such as a fetch stage for fetching instructions, a decode stage for decoding instructions, a rename stage for performing register renaming, and a dispatch or issue stage for dispatching or issuing instructions for execution. Hence, the front end functions of the pipeline discussed above could be performed at any of those stages.

A micro-operation refers to an encoded representation of a particular processing operation to be performed by the execute stage. In general the front end stage maps program instructions fetched from memory to micro-operations to be issued to the execute stage. Each micro-operation may specify an opcode identifying the type of processing operation to be performed and one or more other parameters such as operand identifiers and immediate values for example. For some instructions, each program instruction may correspond to exactly one micro-operation so that the micro-operation may in some cases be identical to corresponding programme instructions. For some instructions the front end stage may append additional information to the decoded program instructions in order to generate the micro-operations, for example deriving some information which is not explicitly specified by the instruction encoding, to provide additional information to the execute stage to enable it to perform the corresponding processing operations.

In some examples, some complex program instructions may be mapped to multiple micro-operations by the front end stage of the pipeline. For example, some program instructions may trigger two or more different processing operations, which could be performed in different execute units of the execute stage, or could correspond to a number of distinct independently schedulable operations performed by one functional unit. For example, a load multiple instruction which triggers loading of data values from memory into two or more different registers could be mapped to multiple distinct micro-operations each corresponding to one of the load operations. Also, some load/store operations may be mapped to distinct micro-operations including a load/store micro-operation handling the actual memory access and an additional arithmetic micro-operation which may trigger an update of an address pointer used to calculate the address of the memory access. In some pipelines multiple program instructions could be coalesced into a single micro-operation if the execute stage supports functionality corresponding to a combination of program instructions. Hence, there may be a one-to-one, one-to-many or many-to-one relationship between the program instructions and the micro-operations.

In some implementations, the processing pipeline may permanently operate in the intra-core lockstep mode, without any ability to turn off the intra-core lockstep functionality.

Alternatively, the processing pipeline may support a normal mode in addition to the intra-core lockstep mode, wherein the normal mode the checker processing is suppressed, and only the main processing is executed. A lockstep mode setting value in a configuration register may control whether the processing pipeline is currently operating in the normal mode or the lockstep mode. The lockstep mode setting value could be hardwired, for example fixed during the manufacturing of a particular device to permanently configure the device to operate in one particular error handling mode. Alternatively, the lockstep mode setting value could be programmable and visible to the instruction set architecture associated with the apparatus, so that software executing on the processing pipeline can change the mode setting value in order to select whether the error handling circuitry operates in the recovery mode or the abort mode.

In some implementations, the error handling circuitry may support a number of different error handling modes for recovering from errors when operating in the intra-core lockstep mode. For example, the error handling modes may include a recovery mode where, in response to the detecting mismatch between the information associated with a different checker operation and its associated main operation, the recovery operation discussed above is triggered. However, the system may also support an abort error handling mode in which instead of performing the recovery operation, the main processing is simply aborted when a mismatch is detected between the information associated with the main and checker operations respectively. For example, an error handling mode setting value stored within a configuration register may specify which of the error handling modes is used when processing in the intra-core lockstep mode. The error handling mode setting value could be hardwired, for example fixed during the manufacturing of a particular device to permanently configure the device to operate in one particular error handling mode. Alternatively, the error handling mode setting value could be programmable and visible to the instruction set architecture associated with the apparatus, so that software executing on the processing pipeline can change the error handling mode setting value in order to select whether the error handling circuitry operates in the recovery mode or the abort mode.

An advantage of providing both a recovery mode and an abort mode may be to provide the flexibility to trade off performance during error-free processing of the main processing against the latency associated with responding to a detected error. While the recovery mode may allow errors to be addressed much faster because it enables forward progress to continue after the error has been corrected, rather than requiring the entire thread of main processing to be suspended and restarted from a much earlier point after executing other instructions in the meantime, the recovery mode may have some impact on the performance achieved during the regular error-free processing of the main processing, because for example supporting a recovery operation may involve the writeback stage deferring writeback of the results of the associated main and checker operations until both results are available and have been determined to match. This may result in other operations which are dependent on the main operation or checker operation being delayed, reducing performance. In the abort mode, deferring writeback until both results of the main and checker operations are available is not needed because instead errors are handled by simply aborting the thread (e.g. by triggering an interrupt and allowing a interrupt handler to terminate that thread and reschedule it later, restarting processing from the beginning of the thread). Hence, a user can select the abort mode if errors are expected to be rare and the delay associated with the fixing error when it is detected is not particularly important, and instead increase performance during the normal error free processing. If the error latency is a more critical factor then the recovery mode can be selected.

Intra-Core Lockstep Mode

The onset of smarter and potentially semi-autonomous vehicles (cars, drones, etc.) represents a growing market for high performance processors. However, safety-critical systems require components to be certified to meet specific integrity levels. For instance the Automotive Safety Integrity Level (ASIL) risk classification scheme provides several levels of classification which vary in terms of the percentage of faults that can be detected. Processors focused on functional safety may be designed to include error detection mechanisms such as online logic built-in self-test, dedicated hardware checkers, etc., which can enable them to be classified at the highest classification level (ASIL D). However, application processors are more focused on performance within a general purpose environment and are less likely to support this degree of added complexity, as the cost and effort of including the error detection mechanisms would be infeasible for more complex higher-performance cores. However, if such a higher performance processor could be certified at a lower safety classification (e.g. ASIL B), then such processors could be combined with a smaller real-time processor for arbitration, to form a system complying with ASIL D, to enable higher performance in a safety-critical environment. Hence, it would be desirable to provide a technique for error detection which enables a higher performance processor to be classified for functional safety. In the lower levels of the classification scheme, it is not required for all potential faults to be detected (e.g. ASIL B requires at least 90% of single point faults and 60% of latent faults to be covered by the error detection scheme). Hence, the lower safety classifications give some freedom to trade off error correction coverage against performance and circuit area or power consumption overhead.

One approach for ensuring functional safety can be to use lockstep computation, where multiple redundant processors are provided, the same code is executed on each of the redundant processors, and outputs of the processors are compared to detect errors. A dual-core scheme with two redundant processors may permit error detection, while a triple-core scheme with three redundant processors may permit both error detection and error correction (since if an error is detected on one processor the correct value can be restored from the outputs of the other two processors). While a lockstep approach can achieve high performance at low development cost, since an existing high-performance processor design can be used for each of the redundant processors without modification, the circuit implementation cost is high because the total area and power consumption of the system is doubled or tripled compared to a single core. Also, as many interfaces on the respective cores may need to be compared to detect errors, a significant amount of additional wiring may be required.

An alternative would be to provide a "virtual lockstep" approach, where a single processor is provided and the same computation is repeated two or more times by time-division multiplexing. For example, a main thread and a checking thread may both be executed on the same processor and their outputs compared to identify errors. However, with this approach, the performance achieved for the main processing is effectively halved since each computation needs to be performed twice sequentially. Also, there is a problem that permanent faults caused by defects in the processor hardware (e.g. short circuits or broken connections) would not be detectable by the virtual lockstep scheme, because the same hardware unit would be used for both the main computation and checking computations, and so both the main and checking computations would be subject to the same error.

Some processors (typically those designed for higher performance) provide vector processing circuitry which supports processing of vector instructions for which a source operand or a result value of the instruction is a vector comprising multiple data elements. In some hardware implementations of the vector processing circuitry, hardware functional units may be provided for executing multiple lanes of processing on respective data elements of the vector in parallel, to improve performance, but even if the lanes are processed sequentially by a single hardware unit, by supporting the processing of a number of distinct data elements in response to a single instruction, code density can be improved and the overhead of fetching and decoding of instructions reduced, which can help improve performance.

Hence, many processor designs may already have vector processing circuitry for performing multiple lanes of processing on vector operands comprising multiple data elements. The vector processing circuitry can often provide some redundancy, since often the same functionality may be supported both by scalar processing circuitry for processing scalar instructions, and by the vector processing circuitry in response to vector instructions, and also there may be redundancy within the vector processing circuitry itself since multiple identical hardware units may be provided for processing the different lanes within a vector. Also, vector processing circuitry may often already support mechanisms (such as predication) for selecting which elements of the vector are required to be processed in response to a given instruction. These features can be exploited for error detection purposes.

Hence, in an intra-core lockstep mode, when main processing is executed on the scalar processing circuitry or on a subset of lanes of the vector processing circuitry, at least one lane of processing on the vector processing circuitry may be used for executing checker processing for checking the outcome of at least part of the main processing, with the outcomes of the main processing and checker processing being compared to detect errors. Hence, unlike the dual-core or triple-core lockstep approach, this approach has a much lower circuit implementation cost, and is suited to higher performance processor designs with a larger physical size, as it can reuse circuitry already available within the processor for error detection purposes (intra-core lockstep), rather than requiring physical duplication of the entire processor (inter-core lockstep). Nevertheless, the approach also allows for improved performance and improved error detection coverage compared to the virtual lockstep approach. Hence, using a vector lane for error checking of main processing can enable more complex processors to be certified for at least the lower levels of functional safety classification, while providing improved performance or reduced hardware complexity for a given level of error detection coverage compared to the techniques discussed above.

Note that the hardware implementation of the vector processing circuitry may vary from embodiment to embodiment. While an instruction set architecture (ISA) may define the functional behaviour which is to be satisfied for a defined set of vector instructions, there may be some design freedom in how to implement this in hardware circuits. For example, some implementations may execute each lane of vector processing in parallel, others may execute each lane sequentially one by one on a common hardware unit, while other implementations may use an intermediate approach where groups of lanes are executed in parallel using a given set of hardware functional units, but multiple passes are required to execute a larger number of lanes corresponding to one vector instruction. Also, some implementations may share some circuitry between the scalar processing circuitry and the vector processing circuitry (e.g. although separate scalar and vector arithmetic units may be provided for integer computations, to save circuit area scalar floating-point instructions may reuse the same hardware units as floating-point vector instructions). Hence, it is not essential for the scalar and vector processing circuitry to be entirely separate. In general, the scalar processing circuitry refers to the collection of circuit elements used in processing scalar instructions, while the vector processing circuitry refers to the collection of circuit elements used in processing vector instructions, which could overlap to some extent.

Hence, in some embodiments it is possible that, for at least some instructions, the checker processing could be executed on the same hardware functional unit as the main processing. This would still allow temporary faults (such as bit flips caused by particle strikes) to be detected. If detection of permanent faults is required to satisfy the safety classification, then other techniques, such as providing software test suites, can be used in conjunction with the running of the checker processing on the vector processing circuitry, to provide the required error coverage. Even if the checker processing on the vector processing circuitry cannot detect all types of errors, it can still protect at least some elements of the processor from errors, and those elements could then be excluded from software testing, reducing the time spent executing the software checks in a test mode, and hence improving the performance of the system.

Nevertheless, in other cases the checker processing may be executed on a different hardware functional unit to the main processing. In practice, many processors supporting vector processing may already have multiple hardware functional units corresponding to different vector lanes, or may already provide separate scalar and vector functional units, but even if this is not the case, other embodiments may use a modified processor design where a few additional hardware functional units (requiring less additional circuitry than if the entire processor was duplicated) are provided for use in the error checking. By using different hardware functional units for the main and checker processing, this improves error coverage (since permanent hardware faults can be detected, not just temporary faults) and also improves performance as it allows the checker processing to be performed at least partially in parallel with the main processing. Also, unlike the virtual lockstep approach discussed above, performance and error coverage would not be limited by the need to reuse the same hardware for the main and checking computations.

Similarly, to improve error detection coverage, it can be useful for operands or status information for the main processing to be stored in a different part of hardware register storage to operands or status information used for the checker processing (e.g. the status information could include a program counter, status flags used for controlling conditional operations, processor mode information, etc.). By using separate register storage, this allows bit flips in the register storage to be detected, since an error in the hardware register used by one of the main processing and checker processing would not affect the other.

It is not essential for all operations of the main processing to be checked using the checker processing. Some types of instructions may not need to be checked in order to ensure functional safety. Also, as discussed below, some types of instructions may not be supported by the vector processing circuitry, so such instructions could be checked using a different (e.g. software-based) error detection technique. Also, a single check may cover multiple instructions. Hence, it will be appreciated that any references below to "checking the outcome of the main processing", or to comparing the outcomes of the main processing and checker processing, do not imply that every operation of the main processing needs to be checked using the checker processing on the vector processing circuitry.

The comparison of the outcomes of the main processing and the outcome of the checker processing could be performed at any time during the respective processing streams. For example, comparisons could be triggered at periodic or irregular intervals, e.g. on certain register writes or at more arbitrary points in the processing. In general, the more frequent the outcomes of the main processing and checker processing are compared, the lower the error signalling latency (delay between the error occurring and the error being flagged or acted upon), but more frequent comparisons may impact on performance. In a mode where the recovery operation discussed above is enabled, it may be preferred to compare the results of each pair of main/checker operations to allow errors to be detected before incorrect results are written to register state.

In one example, in a mode where recovery from errors is handled by an abort of the main processing (rather than the recovery mechanism above), the comparison of the outcomes of the main processing and checker processing may be triggered on performing a store operation for storing data resulting from the main processing to a data store (e.g. a cache or memory). By comparing the outcomes for detecting errors on each store operation, this can prevent errors in the operation of the processor leaking out of the processor into the memory system, which could potentially lead to errors in other devices accessing the same memory system, but this avoids the overhead of comparing values more frequently on each register write. In some implementations, explicit comparison instructions (separate from the store instruction triggering the store operation itself) may be included near the store instruction in the stream of instructions executed by the data processing apparatus for controlling the relevant comparison operations. Alternatively, other implementations may have hardware which triggers the comparison of the main and checker processing in response to the store instruction itself, which can reduce the number of instructions required to be executed and hence improve performance.

To set up the operand values required for the checker processing to mirror those used for the main processing, on performing a load operation of the main scalar processing for loading data from a data store to a scalar register file, or a load operation of the main vector processing for loading data from the data store to a part of a vector register file corresponding to the subset of the plurality of lanes used for the main vector processing, the loaded data may also be loaded to a part of the vector register file corresponding to at least one lane used for the checker processing. The mirrored load may be triggered by a separate instruction included alongside the existing load in the instruction stream, or may be performed automatically in hardware in response to a load instruction in the main processing stream. Similarly, move operations in the main processing (for moving data from one register to another) can also be mirrored in the part of the vector register file used by the checker processing.

In some cases, the same registers in the vector register file could be used for both main vector processing and checker processing. For example, in an implementation where vector instructions are predicated (with a control mask specifying which elements of the destination register should be updated in response to the vector instruction), then the predicates can be set to avoid interference between the checker processing in one lane of a vector register and main vector processing being performed in other lanes, so that the vector registers can be shared and the checker processing does not have a significant impact on the number of vector registers available for use by regular processing.

However, some systems may not support predication at all, or predication may not be supported for all vector instructions. In this case, executing some additional vector instructions with at least one lane providing checker processing to mirror scalar processing could result in changes to other lanes of the vector register, which could affect the outcome of other vector instructions being executed for purposes other than error detection if they use the same registers. This can be prevented by reserving at least one vector register of the vector register file for use by said checker processing. Such reservation could be done either in software (e.g. the compiler generating the code to be executed may prevent certain architectural vector registers being used for any vector instruction other than the instructions providing the checker processing), or in hardware, with certain hardware registers being dedicated for the checker processing that are not accessible in response to regular vector instructions (e.g. an instruction decoder could generate the instructions for the checker processing specifying a reserved hardware register which is not accessible to regular vector instructions, or a register renaming stage could ensure that the vector instructions for the checker processing have their register accesses mapped to a reserved hardware register).

In some cases, one or more lanes of the vector processing circuitry may be reserved as "checker lanes" for performing the checker processing, which cannot be used for regular vector instructions. The reserved lanes could be fixed permanently in hardware, or could be variable using predicate masks. If the main processing is scalar processing, then one lane of the vector processing circuitry could be reserved as a scalar checker lane (e.g. the least significant lane, or most significant lane). If the main processing is vector processing, then multiple lanes could be reserved as checker lanes, corresponding to multiple lanes of the main vector processing. In some cases, lanes may be reserved for both checking of scalar and vector processing, e.g. if there are N lanes available in total, 1 lane can be reserved for checking of the main scalar processing, and up to (N/2−1) lanes (rounded up to the nearest integer if N/2 is not an integer) reserved for checker processing corresponding to the main vector processing which may be performed using (N/2−1) of the other lanes.

To prevent interference between checker lanes and the lanes used for main vector processing, instructions for controlling the vector processing circuitry to perform the checker processing or to perform main vector processing may be associated with predicate information for controlling the vector processing circuitry to mask an outcome of certain lanes. In particular, where a lane is reserved as a scalar checker lane for performing the checker processing corresponding to the main scalar processing, instructions for controlling the vector processing circuitry to perform the checker processing corresponding to the main scalar processing may be associated with predicate information for controlling the vector processing circuitry to mask an outcome of said plurality of lanes other than the checker lane, and instructions for controlling the vector processing circuitry to perform the main vector processing or the checker processing corresponding to the main vector processing may be associated with predicate information for controlling the vector processing circuitry to mask an outcome of at least the scalar checker lane. For certain instructions (e.g. cross-lane vector operations), the instructions for vector processing circuitry or the checker processing corresponding to the main vector processing could also mask out the lanes used for the other of the main vector processing or checker processing corresponding to the main vector processing.

The checker processing using the vector processing circuitry, and the comparison of the outputs of the main and checker processing, can be triggered in software or in hardware.

Hence, in a software-implemented intra-core lockstep mode the sequence of instructions provided for decoding and execution by the processor may be different to the sequence of instructions provided if only the main processing was being executed. Hence, the instruction decoder in the processor may decode a sequence of instructions including instructions for controlling the data processing apparatus to perform the main processing, the checker processing and the error detection. For example, a compiler may generate the sequence of instructions to be decoded/executed by the processor based on code provided by a programmer or other compiler which does not include any instructions for performing the checker processing or comparison steps, so that the programmer writing the original code need not be aware that the error checking will be performed.

With a software-implemented embodiment, the instructions for triggering the checker processing may appear to be regular vector instructions, which may not be distinguished from the vector instructions used in main vector processing. In this case, it is possible that some processor implementations might execute some parts of the checker processing on the same hardware unit as the main vector processing or scalar processing that is being checked. This can be avoided by specifying annotation information with at least one instruction of the sequence instructions, to indicate that the checker processing is to be performed on a different hardware functional unit to the main processing. A given processor implementation may then be responsive to such annotation information to try to schedule the checker processing on a different hardware functional unit to the main processing, if possible, to allow for detection of permanent hardware faults.

Alternatively, a degree of hardware modification may be provided to assist with the error checking.

For example, in some cases the instruction set architecture (ISA) may include one or more dedicated instructions to help support the techniques discussed above. For example, an instruction decoder of the processing apparatus may be responsive to a scalar-vector comparison instruction, to control the data processing apparatus to perform the comparison of the outcome of the main processing and the outcome of the checker processing (when the main processing is the main scalar processing). For example, the scalar-vector comparison instruction may specify a given scalar register, and may trigger a comparison of a value in the given scalar register with a value in a data element of a vector register used by the checker processing. In another version of the scalar-vector comparison instruction, the comparison may compare one or more scalar status flags set in response to the main scalar processing with one or more vector status flags set in response to the checker processing. In some cases, the instruction may simply set a result value or status flag in dependence on the comparison result. However, other implementations may also combine the comparison with a conditional branch operation, so that in response to the scalar-vector comparison instruction, the instruction decoder also controls the data processing apparatus to conditionally branch to a target instruction address in dependence on the outcome of said comparison. This can be useful for directing program flow to a routine for handling detected errors if a mismatch is detected between the outcomes of the main and checker processing.

Such instructions, which directly control a comparison of scalar architectural state with vector architectural state, would be seen as extremely counter-intuitive by a skilled person, because direct interaction between the scalar and vector register files is typically not practical as the scalar and vector register files are often far apart on the physical layout of the processing design and so the relatively long wiring used for routing the values to be compared to a comparator would typically be incompatible with timing requirements imposed by the frequencies with which a relatively high-performance processor is expected to operate. Instead, interaction between the scalar and vector register files would typically be limited to instructions which merely copy a value from one of the scalar/vector register files to the other, rather than performing any additional operation using those values. However, the inventors recognised that, unlike during regular processing, when the comparison is being performed for error checking, the operation is not time critical as it is not on the critical path of the main processing. Hence, it is not necessary for the comparison operation to fit within the normal timing constraints imposed on regular computation operations. Also, in the example where the instruction also triggers a conditional branch operation, while one might expect a general comparison between scalar and vector register files to be difficult to predict using normal branch prediction mechanisms, when a dedicated type of branch instruction is provided specifically for use in the error checking, the branch can be predicted with very high accuracy (always assuming that there is no error), since the cases when errors occur will be rare in comparison to the normal case when the checking processing matches the main processing. Also, when a specific vector lane is reserved as a scalar checking lane, the scalar-vector comparison instruction can be relatively efficient to implement in hardware, as there is no need to provide a multiplexer for selecting arbitrary elements from the vector register—instead the comparison may always receive the value from a certain fixed lane.

In summary, providing ISA support for a scalar-vector comparison instruction enables one instruction to trigger the required comparison operation (as opposed to several instructions for transferring values between the scalar/vector register files, comparing the outcomes, and conditionally branching depending on the comparison result), and such an instruction is not as complex to implement in hardware as one might expect.

Other examples may have further hardware support for automatically controlling the checking and comparison operations, without requiring explicit instructions to be provided for this in the stream of instructions fetched from memory for decoding/execution. This approach is particularly useful when supporting a recovery operation where forward progress of the main processing continues after the connection of an error (as the pipeline may have some micro-architectural modification to support the recovery operation, it can also be efficient to include some micro-architectural changes to the front end stage to enable checker operations to be generated automatically when executing program code not written with intra-core lockstep in mind).

Hence, in some cases the data processing apparatus may comprise control circuitry to control the vector processing circuitry to perform the checker processing using at least one lane of the plurality of lanes provided by the vector processing, and error detection circuitry to perform error detection in dependence on a comparison of an outcome of the main processing and an outcome of the checker processing. For example, the control circuitry could be the instruction decoder, which may generate instructions for controlling the checker processing. The error detection circuitry could be dedicated hardware for automatically comparing the outcomes of the main and checker processing in response to store instructions or other instructions within the main processing stream, or alternatively could be an existing comparator or arithmetic circuit within the scalar or vector processing circuitry, which could be controlled by a compare instruction (either a conventional compare or one of the scalar-vector compare instructions described above) to compare values derived from the main and checker processing circuitry.

In some cases, all processing performed by the data processing apparatus may be checked using the checker processing on the vector processing circuitry, while other examples may only perform checker processing corresponding to certain parts of the main processing.

In one example, the data processing apparatus may have a number of modes of operation including a first (intra-core lockstep) mode in which the checker processing is executed in addition to said main processing, and a second mode in which execution of the checker processing is suppressed. For example a mode setting value in a configuration register could be used to set the current mode of operation. The mode setting value may be hardwired during manufacture of a given device, so that at implementation time the device is fixed to operate in the first mode or second mode as desired, and it is not subsequently possible for software to modify the mode bit. Alternatively, the mode setting value could be programmable by software running on the processor, so that the software can select whether to operate in the first mode for improved fault tolerance or the second mode for improved performance.

Any hardware assisted functions supporting the error checking (such as automatically mirroring loads in the main processing to the parts of the register file used by the checking processing, or automatically comparing the main/checker processing on a store in the main processing) can be disabled in the second mode but enabled in the first mode. This approach can be useful for reducing the energy and performance overhead for non-lockstep use cases. For example, in the second mode the full vector width can be used by main vector processing as there is no need to reserve any lanes or vector registers for checking purposes—hence the number of lanes of vector processing available for use in the main vector processing in the first mode may be less than the number of lanes of vector processing available for use in vector processing performed in the second mode. Similarly, in some embodiments the number of vector registers which are available for the main processing may be less in the first mode than in the second mode.

In one example, the data processing apparatus may have an instruction decoder which maps a first sequence of instructions comprising instructions defining the main processing to a second sequence of instructions comprising instructions defining the main processing and the checker processing, and to control the data processing apparatus to perform data processing based on the second sequence of instructions. Hence, in this case the software tool chain (e.g. compiler) which generates the code to be executed by the processor does not need to be aware of the error checking functionality, as the instruction decoder within the processor itself can automatically generate the required instructions for controlling the downstream processing circuitry to perform the checking processing. Similarly, the decoder may also generate instructions for controlling the data processing apparatus to perform the comparison of the outcome of the main processing and the outcome of the checker processing (if this is not already controlled automatically in hardware).

For example, the instruction decoder may map a scalar instruction of the first sequence of instructions to a scalar instruction and a checker vector instruction of the second sequence of instructions. Hence, scalar instructions are effectively decoded twice, once to generate the instruction for controlling the main scalar processing, and once for generating the checker vector instruction for controlling the checker processing on the vector processing circuitry. The checker vector instruction generated by the decoder may be associated with predicate information for masking lanes other than the scalar checking lane, or alternatively this predicate information may be implicit in some embodiments.

In some cases, the vector processing circuitry may not support all the functionality available to scalar instructions. If the instruction decoder encounters a scalar instruction in the first sequence of instructions which corresponds to an operation unsupported by the vector processing circuitry in response to a single vector instruction, this can be handled either by:

triggering an exception condition (e.g. signalling an undefined instruction, which could then be handled using a software exception handler which may provide error checking functionality), or by mapping the scalar instruction to two or more vector instructions of the second sequence of instructions for performing a combined operation corresponding to the operation of the scalar instruction, which may have reduced performance but still permits detection of permanent hardware faults, or by mapping the scalar instruction to two scalar instructions which can be executed back to back on the scalar processing circuitry. For example, the scalar instruction can simply be executed twice, which would at least permit detection of temporary hardware faults, as well as some permanent faults if there are two or more functional units of the same type and either hardware support or ISA hints are provided to ensure that the two scalar instructions are issued to separate functional units.

Which approach is taken may be selected depending on implementation needs and the desired error detection coverage sought for a given level of safety classification.

On the other hand, when encountering a vector instruction in the first sequence of instructions, the instruction decoder may map the vector instruction to one of: a single vector instruction of the second sequence of instructions for which a first subset of lanes correspond to the main vector processing and a second subset of lanes correspond to the checker processing; or to a first vector instruction corresponding to the main vector processing and a second vector instruction corresponding to the checker processing. Whether the checker processing can be executed within the same instruction as the main vector processing may depend on the type of instruction. For example, while it may be safe to execute in-lane arithmetic instructions without any cross-lane dependencies with the main and checker processing in different subsets of lanes within the same instruction, for instructions such as permute instructions where an element at a given position in the result vector depends on elements at other positions in the source vector, executing the checker processing in the same instruction as the corresponding main processing could cause interference between independent operations, and so in this case it can be preferable to split the instruction into two separate vector instructions, one for controlling the main vector processing and another for controlling the checker processing.

In some cases, the vector processing circuitry may have at least one hardware functional unit providing functionality required for a scalar instruction which is not required for any vector instruction of an instruction set architecture supported by the data processing apparatus, and the checker processing may be executed using the at least one hardware functional unit. For example, although a certain operation may not normally be supported in the vector processing, expanding at least one hardware functional unit to support that operation can be useful for reducing the number of scalar instructions which do not have a vector equivalent.

Some specific examples are discussed below. It will be appreciated that the invention is not limited to these particular examples.

Figure 1:
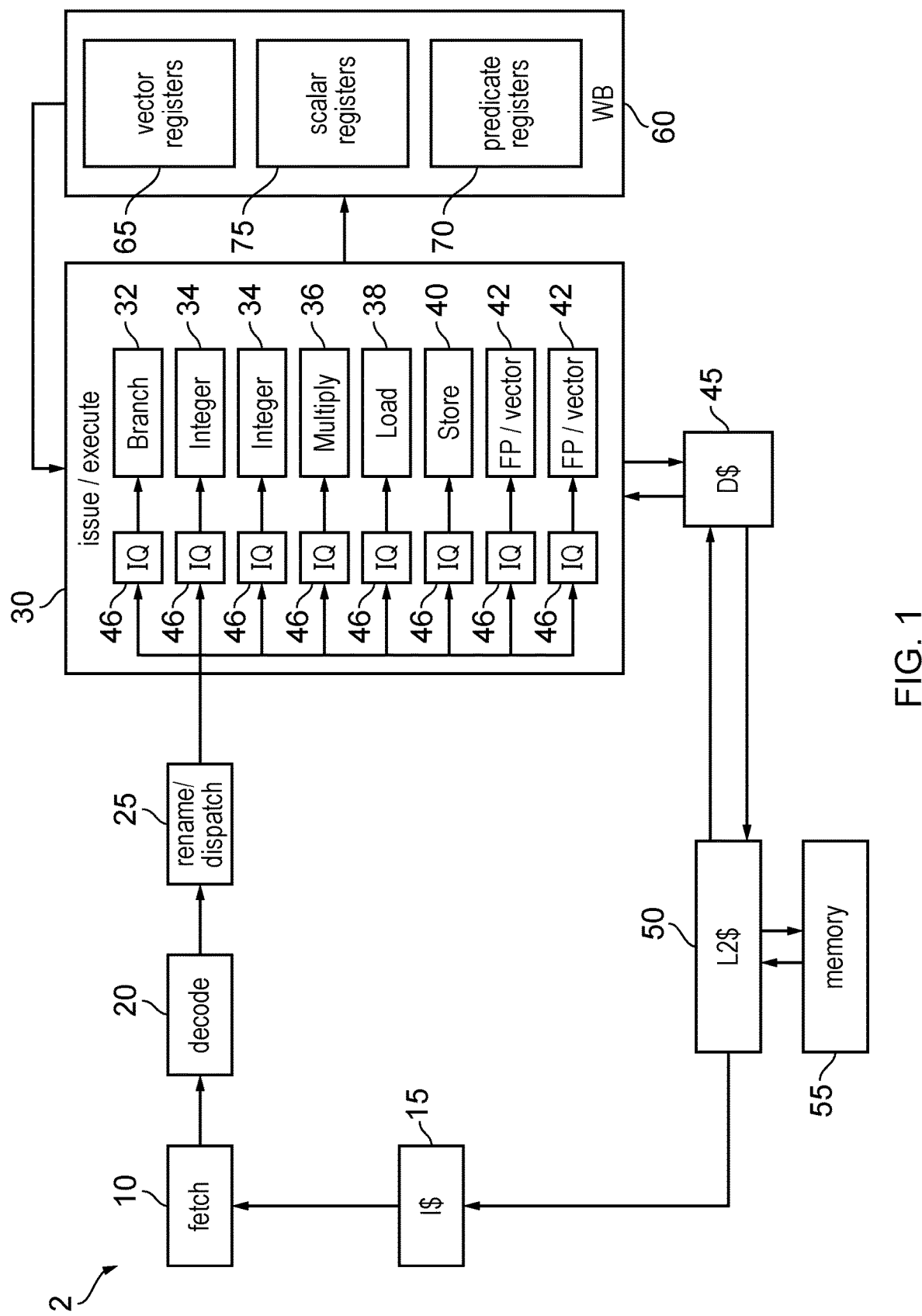

FIG. 1 is a block diagram of a data processing apparatus 2 in which the techniques of the described embodiments may be employed. In the example shown in FIG. 1, the apparatus 2 takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry (instruction decoder) 20 which decodes each instruction in order to produce appropriate control signals for controlling downstream execution resources within the pipelined processor to perform the operations required by the instructions. The control signals forming the decoded instructions are passed to register renaming and dispatch circuitry 25. The register renaming/dispatch circuitry 25 maps the architectural registers specified by the instructions to physical registers from a pool of physical registers 65, 70, 75 (the pool of physical registers typically being larger than the number of architectural registers), thereby enabling certain hazards to be removed, facilitating more use of out of order processing. The register renaming/dispatch circuitry 25 also dispatches the renamed instructions to the issue/execute stage 30 of the pipeline.

The issue/execute stage 30 comprises a number of execution pipelines 32, 34, 36, 38, 40, 42 for executing different types of instructions. The execution pipelines 32-42 may collectively be considered to form processing circuitry. While FIG. 1 shows an example where the issue stage is split into a number of smaller issue queues 46, with each execution pipeline 32-42 associated with a corresponding issue queue 46 for queueing instructions to be processed by that pipeline 32-42, other examples could have a combined issue queue 46 shared between more than one execution pipeline 32-42.

Instructions remain in the relevant issue queue 46 until the operands required for that instruction are available in the registers. In particular, source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations. The registers can also include registers for storing control information or status information, such as a program counter indicating a current point of execution of the program, condition status flags for controlling the operation of conditional instructions, processor mode bits, etc.

When the required operands for a given instruction in the issue queue 46 are available and the corresponding functional unit is ready, the instruction is issued to the relevant execution pipeline. In this example, the execution pipelines 32-42 include a branch instruction pipeline 32 for executing branch instructions, two integer pipelines 34 for executing scalar integer arithmetic instructions other than multiply or multiply-accumulate operations (e.g. add, subtract). A separate multiply pipeline 36 is also provided for handling multiply or multiply-accumulate operations (other examples could combine the integer and multiply pipelines 34, 36 into a single unit). A load pipeline 38 is provided for executing load operations for loading a given scalar register 75 or vector register 65 with data read from the memory system (via a data cache 45 and any intervening further levels of cache such as a level 2 cache 50), and a store pipeline 40 is provided for handling store operations for storing data from a given scalar/vector register 75, 65 to the memory system 45, 50, 55. Also, two floating-point (FP) and vector processing pipelines 42 are provided for handling scalar or vector floating-point operations and other non-floating point vector operations. In this example, the scalar floating-point instructions are executed within the vector processing pipelines 42 to avoid duplication of the floating-point circuitry, but it would also be possible to provide a separate scalar floating-point unit. Hence, the pipelines 32-42 may all be seen as scalar processing circuitry supporting execution of scalar processing, while pipelines 38, 40, 42 may be seen as vector processing circuitry supporting processing of vector instructions using two or more lanes of processing performed on vector operands (the load/store pipelines 38, 40 may handle vector load/stores). The results of the executed instructions are written back to the registers 65, 70, 75 at a writeback stage 60 of the pipeline. It will be appreciated that the set of execution pipelines 32-42 shown in FIG. 1 is just one example, and other embodiments may have a different numbers or types of execution pipelines.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided for supporting out-of-order execution (e.g. a reorder buffer may typically be provided to keep track of the out of order execution, and to allow the results of the execution of the various instructions to be committed in order). In an in-order implementation, the rename stage 25 may not be required.

Current and upcoming application processors include increasingly wide Single Instruction Multiple Data (SIMD) datapaths and more powerful vector execution units. A range of vector instructions may be supported capable of emulating the behaviour of the vast majority of scalar instructions. In addition, predicate registers allow many instructions to selectively enable or disable individual vector lanes. As shown in FIG. 2, a set of hardware mechanisms and/or compiler-generated instructions can be provided to repurpose one or more vector processing lanes to run in lockstep with scalar functional units, and to replicate the contents of scalar registers within the vector register file. This allows checker processing to be executed on at least one lane of the vector processing circuitry 42 for checking the outcome of main processing performed either on the scalar processing circuitry 32-42 or on other lanes of the vector processing circuitry 42.

For ease of explanation, we shall first describe an example where the main processing is scalar processing (other examples where the main processing is vector processing are discussed later). A number of potential implementation variants are given below, but FIG. 2 shows the basic concept:

A. Scalar loads and move operations are mirrored to a specific lane in the equivalent vector register, e.g.
  load<foo>into x0→move<foo>into v0[n]
  load<foo>into x1→move<foo>into v1[n]
  (where n is the index of the register element corresponding to the vector lane reserved for intra core lockstep)

B. Scalar operations are mirrored with equivalent vector operations (on lane n). For example, when a scalar add instruction for adding the contents of registers $X_A$ and $X_B$ is performed in the main processing, this is mirrored using a vector add instruction which performs a similar addition on lane n of vector registers $vSrc_A$ and $vSrc_B$. As shown in FIG. 2, lanes other than the lane used for the checker processing can be masked by using a predicate ($P_{lockstep}$).

C. On a scalar store operation, the value in the target register for the store operation is compared with an equivalent vector register element in the vector register file 65, and if a mismatch is detected then a fault is signalled, e.g. by branching to a location of handler code if the comparison gives a not equal result, and the handler then signalling the error to other devices or taking steps to address the error (e.g. by triggering a reset to a previous point of execution). Further comparisons may be performed on processor internal values (e.g. flags) to increase coverage.

Figure 3:
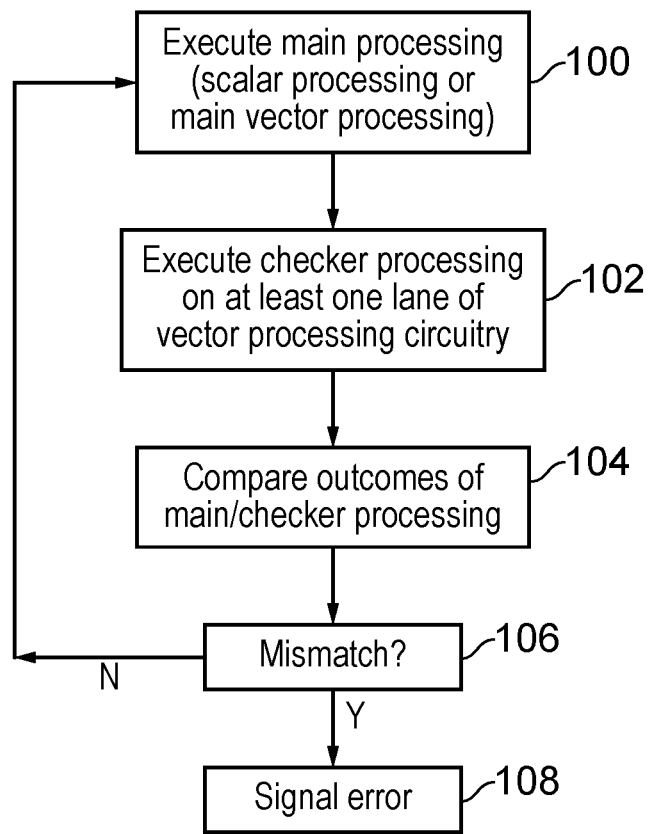
FIG. 3 shows a method of checking errors in main processing using at least one lane of vector processing circuitry.

FIG. 3 shows a flow diagram illustrating such a method. At step 100, main processing is executed, which could be scalar processing on the scalar processing circuitry 32-42 or vector processing on a subset of lanes of the vector processing circuitry 42. At step 102 checker processing is executed on at least one lane of the vector processing circuitry 42 (either in parallel with the main processing or sequentially). At step 104 outcomes of the main and checker processing are compared, and if a mismatch is detected at step 106, then an error is signalled at step 108, while otherwise the method returns to step 100 to continue with the main processing and checker processing.

Referring to FIG. 1, while the functionality within the integer 34 and multiply 36 pipelines may be replicated within the vector data path 42, other units such as the branch pipeline 32 or load/store pipelines 38, 40 are unlikely to be replicated for a vector data path. Hence, the intra-core lockstep scheme may not be able to detect permanent faults within those components (errors in these components could be detected by other techniques such as using software testing). Similarly, in cases where the same functional unit (FU) is shared for scalar and vector computations (e.g. the floating-point unit in the example of FIG. 1), then shared functional units would not be able to detect permanent faults within them based on the proposed schemes, so again some other testing technique could be used for these. Nevertheless, the mirroring of scalar operations on the vector processing unit still reduces the number of elements which need to be tested by other means, to help improve performance.

Note that the vector functional units (FUs) 42 may be slower than corresponding scalar FUs 34, 36 even when executing substantially the same operation. This could be partially offset by favouring scalar operations for lockstep integration, e.g. move lockstep value into scalar register and use scalar compare instead of vector-register based version show in FIG. 5 below. Also, assuming the absence of direct dependencies, some long latency vector instructions may be overlapped with multiple scalar instructions. Also, processors may include multiple scalar FUs of the same type (e.g. two Integer FUs 34 in FIG. 1). In some cases, it may be possible to offset this by providing multiple narrow FUs rather than one wide FU, e.g. two units operating on two elements in parallel rather than one unit operating on 4 elements, so that vector operations on a small number of lanes (e.g. only one for the proposed scheme) could be parallelised.

Three implementation variants are discussed below, which are ordered based on the level of hardware support required.

Purely Compiler Driven

This approach has the advantage that there is no hardware overhead or opcode overhead in the ISA, as an existing processor design can be used without any modification at all. Instead, the control of the checking operations for intra-core lockstep is performed in the software toolchain, with recompilation of the code to be executed to include additional instructions for performing the checker processing and the comparisons. Also, an operating system exception handler may be provided to deal with faults raised by the error checking.

Figure 4:
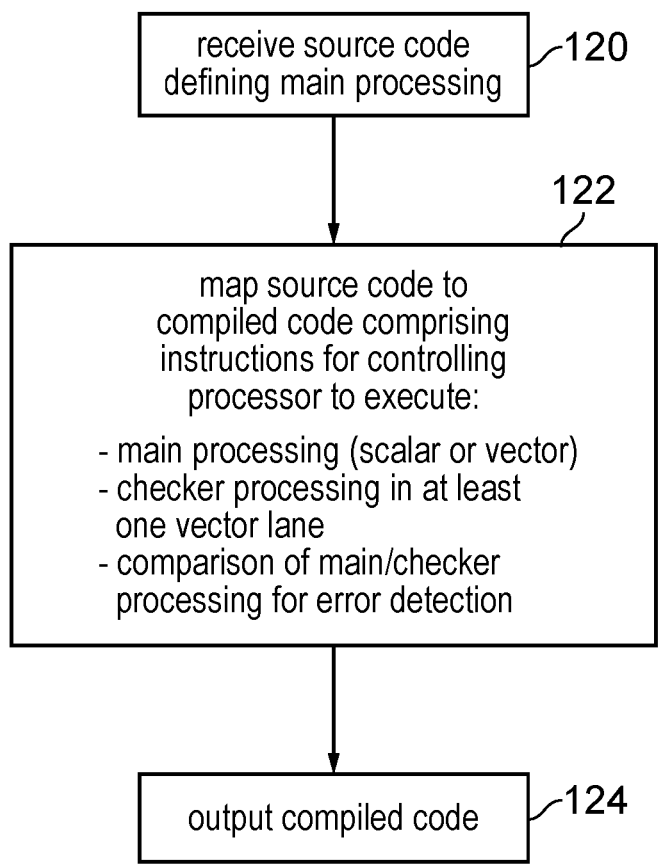
FIG. 4 shows a method of generating compiled code including instructions for triggering the main processing and checker processing and for comparing outcomes of the main processing and checker processing.

FIG. 4 shows a flow diagram illustrating a method of compiling code for an apparatus 2 having scalar and vector processing circuitry. At step 120 source code providing a first sequence of instructions defining the main processing is received by the compiler. The source code could be high-level code written by a programmer, or could be compiled code in assembly language which was earlier compiled from high-level code from the programmer. At step 122, the source code is mapped to a second sequence of instructions (compiled code), which includes at least instructions for controlling the processing apparatus 2 to execute the main processing (scalar or vector), the checking processing in at least one lane of the vector processing, and one or more comparisons for comparing outcomes of the main and checker processing for error detection. At step 124 the compiled code is output, and the compiled code can then be stored in the memory 55 of the processing apparatus 2, so that when the compiled code is fetched and decoded, the processing apparatus 2 will perform the method as shown in FIG. 3.

For example, FIG. 5 illustrates how the assembly code corresponding to a basic C code example may be annotated to verify the computation result of "total" before it is written back to memory. Note that the loop counter "i" is not checked as part of each loop iteration. As it affects the value of "total", it is implicitly checked before "total" (R0) is stored back to memory. The compiler introduces additional vector move instructions (vDUP) for mirroring the scalar move instructions (MOV) in the assembly code, additional vector arithmetic instructions (vADD, vSUB) corresponding to the scalar arithmetic instructions ADD, SUBS of the assembly code, and some instructions vDUP, vCMP, BNE at the end of the loop for copying the scalar result R0 to the vector register file and comparing it with the outcome of the checker processing in vector register V0, and branching to a handler if a mismatch is detected. If no mismatch is detected, the scalar store operation (STR) is allowed to proceed. While this approach increases performance for the common case (no fault), it does not allow the detection of endless loops. This may be acceptable, as such a loop would not corrupt architectural state while running and the corresponding (faulty) thread could be terminated by other means (e.g. using a watchdog timer). The main advantage of a purely compiler driven approach is the ability to operate on unmodified hardware. However, not all scalar instructions have a vector equivalent, so this approach may restrict the set of scalar instructions available to the compiler, or alternatively multiple vector micro-operations may be used to emulate one scalar instruction (this may require additional (temporary) vector registers). Also, comparisons introduced by the lockstep mechanism may pollute status flags (e.g. condition flags set for allowing evaluation of conditions for resolving conditional instruction, which in some embodiments may be shared between the scalar and vector processing circuits). In this case, the compiler may need to be aware of the way the condition flags are implemented, to mitigate undesired effects.

Without ISA and hardware support to directly compare scalar registers to vector elements (as discussed in the variants below), a vector register (e.g. Vx in FIG. 5) can be reserved to temporarily hold a scalar value prior to comparison, or alternatively, the lockstep element may be transferred into a scalar register for comparison. In either case, if a register has to be reserved for the comparison, this would not permit 1:1 matching between IDs of scalar and vector registers (i.e. R0 to V0[n], R1 to V1[n], . . . ), so there may be some increase in register pressure. This can be avoided in the ISA assisted and hardware supported embodiments discussed below.

With a purely compiler-implemented variant, unpredicated instructions used for lockstep operations can change (corrupt) data held in remaining vector elements in other lanes. As some ISAs may only provide predicates for a subset of instruction types, then to avoid cross-interference between the checking processing and regular vector operations, some registers may need to be reserved for the scalar checking operations, effectively limiting the number of vector registers available for use by the compiler for conventional vector code.

On the other hand, if vector instructions are predicated (allowing vector registers to be shared between conventional vector code and the checking operations), then the compiler may need to introduce additional instructions for managing the predicates for the respective vector instructions, as a vector register may now contain data for conventional vector elements, lockstep vector elements (for checking outcome of conventional vector processing) and a lockstep scalar element (for checking outcome of scalar processing). These additional instructions for setting the vector predicates may reduce performance compared to a non-lockstep case.

Detection of permanent faults in vector FUs requires conventional and lockstep instructions to be processed in different FUs (or in different FU lanes of the vector processing unit). Software may not be able to guarantee this, potentially reducing the error detection coverage of a purely compiler driven implementation variant. However, some processor designs may support annotation information which can be provided with selected instructions to force them to be executed on different FUs, so the compiler can use such annotation information to provide hints that the vector instructions for error checking should be scheduled on a different FU to the regular code.

Figure 6:
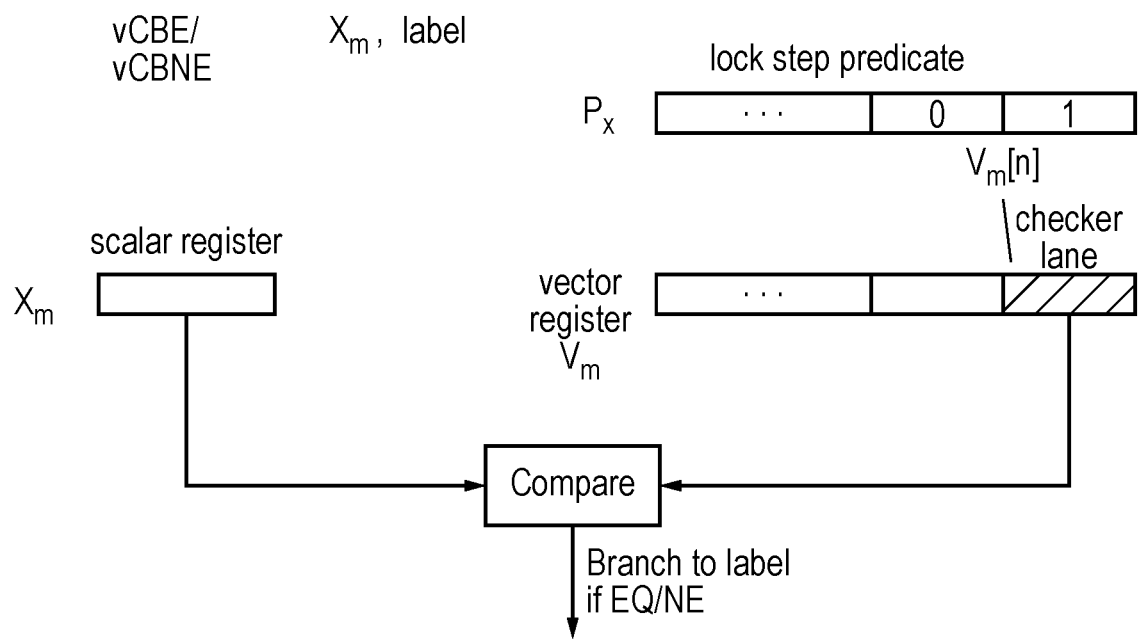
FIG. 6 shows an example of an instruction for comparing a scalar register with an element of a vector register and conditionally branching to a target address in dependence on the outcome of the comparison.

With a purely compiler-driven embodiment, the special purpose registers (e.g. status flags, program counter) may be shared between the scalar and vector processing. Some errors in the special purpose registers may have a knock on effect in other operations, so that such errors can still be detected by the comparison between the main and checker processing. For example, in the case of the program counter (PC), the interleaving of corresponding scalar and vector instructions allows the detection of a subset of faults, e.g. a branch to an arbitrary location may "skip" a different number of scalar than vector instructions, and therefore cause a subsequent comparison to fail. However, for other types of errors that may not be detected by the comparison between the main and checker processing, orthogonal error detection techniques (e.g. using software testing) could be used to detect such errors. ISA assisted The compiler driven approach described above can be improved significantly by providing a small degree of ISA (Instruction Set Architecture) support for intra core lockstep. For instance an instruction can be provided to compare a scalar register with a vector element and branch on equal/not-equal (vCBE/vCBNE). FIG. 6 shows an example of this type of instruction. The instruction specifies $X_m$, identifying the scalar register used for the comparison, and an address "label", which identifies the branch target location to branch to if the equals or not equals condition is satisfied. The address "label" can be expressed as an offset relative to the program counter (the address of the current instruction). Whether the vCBE or the vCBNE version of the instruction is used can be selected depending on whether the error handling code is located sequentially to the code providing the main and checking processing (e.g. when vCBE can be used so that there is branch on equals (EQ) to the next piece of code to provide main/checking processing), or at a non-sequential location (e.g. when vCBNE can be used so that there is a branch on not equals (NE) to the error handler). Although the branch target address could be the actual address identifying the error handler or the next piece of main/checking processing to be executed, in practice there may be a limited number of bits available in the instruction encoding for identifying the address. If there are not enough bits available to encode the actual branch target address, a trampoline structure could be used, where the label encodes a short jump to a nearby unconditional branch instruction, and the unconditional branch instruction then branches to the actual target address. This approach helps to keep the opcode size small, and especially for the vCBNE version of the instruction, the slight reduction in performance by having to execute two instructions for the branch instead of one is generally acceptable as faults would be rare.

The other operands of the instruction can be implicit. If there is a 1:1 mapping between the scalar registers used for the main scalar processing and the vector registers used for the corresponding checking processing, then the identification of scalar register $X_m$ may also implicitly identify that the vector element to be compared with the scalar register $X_m$ is element n of the corresponding vector register $V_m$, where n is the scalar checking lane which can be determined by an implicit lockstep predicate value $P_x$ or be implicitly fixed in hardware. Alternatively, the vector register $V_m$ or the lockstep predicate $P_x$ could also be specified in the instruction encoding. Similarly, the instruction could use another register operand to indicate a register holding its branch target, rather than using a label.

When the vCBE or vCBNE instruction is fetched from the instruction cache 15, it is decoded by the instruction decoder 20, which controls the execute stage 30 to perform an operation as shown in FIG. 6, where the value in scalar register $X_m$ is compared with the value in element n of vector register $V_m$, and a conditional branch to the address indicated by "label" is performed in dependence on whether the result of the comparison was equals or not equal (with a branch occurring on EQ for vCBE or on NE for vCBNE).

An alternative version of these instructions could compare scalar and corresponding vector flags. The flags may be condition status flags indicating a property of a previous processing result, e.g. whether the result was negative, whether the result was zero (or equals for a comparison operation), whether the result generated a carry (unsigned overflow), or whether the result overflowed (for signed arithmetic). Conditional instructions may use the condition status flags to evaluate their condition and determine whether the associated operation should be performed. Hence, a difference in the status flags can indicate that there was a difference in the operations which generated the flags, so can signal an error in one of the main and checker processing. Hence, the flag comparing instruction may compare the outcome of the main/checker processing by comparing the scalar and vector specific flags generated by the main and checker processing, rather than the integer or floating-point values generated by the main and checker processing. This would have the advantage that there may be fewer operands required by the instruction (as both the scalar and vector flag registers can be implicit as they would always be the same register) and fewer interactions between scalar and vector registers (no need to multiplex data from arbitrarily selected register to the comparator). However, while such an instruction could detect errors in variables used to determine branch conditions (e.g. R1 in the FIG. 5 example), it may not cover errors in values to be written to memory (e.g. R0 in FIG. 5). Hence, some implementations may support both the data value comparing and flag comparing forms of the scalar-vector comparison instruction in order to support detection of both types of error.

Note that the ISA instruction examples above are by no means exhaustive and can be seen as orthogonal to each other. Alternative implementation variants may choose to separate the comparison of a scalar register and a vector register element from the subsequent conditional branch, i.e. to use a vCMP instruction, which compares a scalar register used by the main scalar processing with the element of the corresponding vector register used by the checking processing, followed by a conditional branch instruction BNE. This would reduce the opcode overhead introduced by avoiding the label operand. However, it would also potentially lower performance, due to an increased instruction count, the need to pollute scalar flags, and so on.

In summary, providing a native instruction in the ISA which can be decoded by the instruction decoder to control a direct comparison between a value in the scalar register file and a value in the checker lane of the vector register file can be very useful to improve performance of the intra-core lockstep checking using the vector processing circuitry 42. One would normally seek to avoid direct interactions between the scalar and vector register files for performance reasons, as the long wiring between the physically remote scalar and vector register files on a typical high-end processor would make the timing constraints difficult to meet at the frequencies generally required to be supported by such a processor. However, for the scalar-vector comparison instructions discussed above, this is not generally a problem, since they are not time critical, and in the combined comparison/branch versions of the instruction, the branch outcome can be predicted with very high accuracy (assume no fault since faults are rare). Also these instructions only require connections to a specific vector lane used for the scalar checking, so there is no need to multiplex an arbitrary element from a vector register, instead simply forward the predetermined "lockstep" element to a scalar comparator.

Such instructions provide a performance benefit for several reasons. Firstly, there is reduced pressure on vector register file, since there is no need to temporarily hold a result of an instruction for transferring a scalar value to the vector register file (e.g. the vDUP instruction in FIG. 5) or vice versa. Also, it performs the comparison and branch in one instruction instead of three instructions (vDUP, vCMP and BNE as in FIG. 5), so there is reduced pressure on internal queues (e.g. decode queue, issue queue 46), and improved code density reduces instruction cache 15 pollution. The instruction can be easily predicted by branch predictors with high accuracy (as faults should be rare), as the instruction type provides good hint to prediction logic (so potentially more reliable than a generic branch instruction). Also, the use of a special compare/branch instruction means that the comparison for lockstep checking does not pollute the scalar condition status flags, so there is more freedom for the compiler to optimize the order of instructions. The instructions can also provide potential energy savings, as there is a reduced number and scope of vector operations and increased performance.

Hardware Assisted

Other than providing ISA support for additional instructions as discussed above, a number of further hardware modifications can provide even greater performance for the lockstep checking. In some examples, the processing apparatus 2 may have a lockstep specific hardware mode, which can provide the most comprehensive error detection coverage and best performance of the proposed implementation variants. Depending on the specific implementation, it can be designed to provide intra core lockstep protection transparent to user level applications; i.e. without the need to recompile an existing code base. Its ISA footprint can be kept slim, e.g. one software readable status register bit indicating hardware support for the mode and an exception handler to trap into after a fault was detected. The trade-off regarding a high degree of hardware support is cost, not just in terms of area overhead and design time, but also in validation complexity. The following section describes examples for components that may be implemented as part of a lockstep mode.

Firstly, the processor may support a lockstep mode bit to distinguish lockstep from conventional operation, so that energy and performance overhead can be reduced for non-lockstep use cases while still supporting the lockstep processing as well. For example, a status register may provide the lockstep mode bit, which can be set to indicate that the processor should operate in lockstep mode or cleared to indicate that the processor should operate in non-lockstep mode. In non-lockstep mode, the instructions defining the main processing to be performed would be decoded as normal, without introducing additional instructions into the pipeline to trigger checker processing or the comparisons of the main and checker processing. The full vector width would be available for vector instructions (including all the lanes supported by the vector processing units 42).

On the other hand, in the lockstep mode, the instruction decoder 20 may be modified to inject additional instructions into the pipeline corresponding to the checker processing and comparison of the main and checker processing. For example, instructions can automatically be decoded twice. In the case of scalar main processing, a scalar instruction can automatically be decoded once as a scalar instruction and a second time as a corresponding vector instruction providing the checker processing. In the case of vector main processing, the vector instruction could be mapped either to a single vector instruction with a first subset of lanes providing the main processing and a second subset of lanes providing the checker processing, or to two separate vector instructions corresponding to the main and checker processing respectively.

FIG. 8 shows a method of decoding instructions in a hardware-assisted embodiment. At step 130, a first sequence of instructions is fetched from the instruction cache 15, comprising instructions for controlling the pipeline to perform the main processing (which could be either scalar or vector processing or a mixture of both). At step 132 the first sequence of instructions is mapped to a second sequence of instructions (also known as micro-operations, which represent the internal operations supported by the execute stage 30 as opposed to the macro-operations defined in the ISA) by the decoder 20. The second sequence of instructions includes instructions for performing the main processing defined by the first sequence, as well as checker processing providing corresponding operations to the main processing, with the checker processing executed on at least one lane of the vector processing unit 42. Note that in the case where the main processing is vector processing, the checker processing could be implemented using the same instructions as the main processing (with partitioned lanes), so it is not essential for separate instructions to be generated. Optionally, the second sequence of instructions may also include instructions for triggering a comparison of the main/checker processing (which could be generic compare instructions or the specific scalar-vector comparison instructions discussed above). On the other hand, if the hardware automatically triggers comparisons between the main and checking processing in response to store instructions then including such comparison instructions may not be required. At step 134, the second sequence of instructions is output to the next pipeline stage 25 and the instructions are processed by the remainder of the pipeline.

Also, the processor may have hardware for automatically transferring results of scalar loads to specific elements of a corresponding vector register. Similarly, scalar operands resulting from scalar processing may automatically be compared against the equivalent vector element prior to a scalar store operation, with a fault exception being raised on a mismatch. Both of these operations may be triggered automatically either by generating corresponding micro-operations in the instruction decoder 20, or by using dedicated forwarding paths between certain elements within the vector register file and certain scalar functional units such as the load/store pipelines 38, 42 or arithmetic units 34, 36.

Some scalar instructions may not have a vector equivalent. A compiler flag could be used to limit the available instructions used by the compiler when compiling code intended for use in the lockstep mode. Alternatively, if the instruction decoder 20 encounters an instruction not supported in lockstep mode, then the decoder 20 could either raise an exception (e.g. an undefined instruction exception), or re-execute the instruction twice in a scalar functional unit (read value from vector register file, execute in scalar FU, then write-back to vector register file, although this would not allow detection of permanent faults in scalar FUs (unless they could be reserved for lockstep execution)). Another option would be to map the unsupported scalar instruction to a combination of two or more vector instructions which achieve the same result. Certain instruction types (e.g. branches or memory barriers) could be ignored by the decoder for lockstep purposes since they are unlikely to have vector equivalents and they can be checked by other means (e.g. through software checking).

Figure 7:
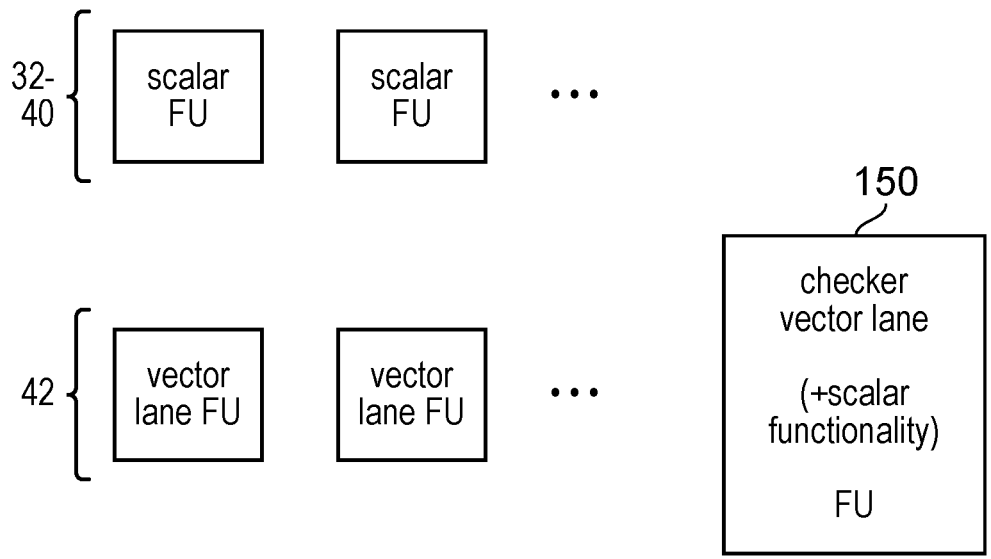
FIG. 7 shows an example where a lane of vector processing is reserved for the checker processing, and a hardware functional unit in the checker lane has expanded functionality compared to other lanes.

Another way in which the hardware may help support intra-core lockstep checking may be to expand the functionality of certain functional units within the execute stage 30. For example, as shown in FIG. 7, the execute stage may have a number of scalar hardware functional units (e.g. corresponding to execution pipelines 32-40) and a number of vector lane hardware functional units (part of the vector pipelines 42). The number of vector lane functional units need not be the same as the maximum number of supported vector lanes, as a larger number of vector lanes can be processed in several passes of the functional units. While generally each vector lane functional unit would normally be identical, to support lockstep checking in a dedicated checker vector lane, at least one vector hardware functional unit 150 may partially or fully replicate functionality of one or more scalar FUs for one vector lane. This is an optional feature, but if a checker vector lane with expanded functionality can be provided, this can increase number of supported instructions in lockstep mode, and so increase error detection coverage for permanent faults compared to the case where the decoder re-executes unsupported instruction in scalar FU.

Also, the hardware may use an implicit lockstep predicate value, to avoid conventional vector instructions from impacting results of lockstep instructions generated corresponding to scalar operations (see the checking of main vector processing discussed below). By using an implicit lockstep predicate value (i.e. a fixed designation of the lane reserved for lockstep checking of the main processing and hardware-implemented masking of effects of checking instructions on other lanes), there is no need to include instructions for managing the lockstep predicates in the predicate registers 70, which can improve performance not only due to executing fewer instructions, but also because there is reduced predicate register pressure. Also this can save ISA encoding space.

Another hardware assisted feature can be to replicate vector status flags to provide a separate set of vector status flags for use by the lockstep checking instructions. This avoids pollution of conventional vector flags by lockstep instructions, so that intra core lockstep for vectorised code can be supported without needing compiler support to avoid adverse effects from flag pollution, and improves error coverage when existing code is executed in a lockstep manner by the modified hardware. The branch execution unit 32 can check the relevant scalar and vector flags on executing a conditional branch instruction, to ensure that they match, and if there is a match, execute the branch as usual, while if there is a mismatch between the scalar and vector flags, a "fault" exception can be raised as this indicates a divergence between the main and checker processing.

Also, special purpose registers (e.g. the program counter, status registers, processor mode bits) can be replicated. Some processor designs may typically share a set of special purpose registers between the scalar and vector processing circuitry, but by replicating a second set for lockstep checking, this provides increased error detection coverage since errors in the special purpose registers can now be detected too. Similarly, address computations for branch targets and memory (load/store) instructions could be replicated to increase error coverage. The hardware overhead of replicating address computations would typically be moderate as most processors may already include multiple integer ALUs 34 suitable for address computation.

The above examples for hardware modifications simplify the adaption of intra core lockstep (by making it software transparent), reduce its performance penalty and increase its error detection coverage. It will be appreciated that it is not essential to include all of these modifications—any combination of the techniques discussed above can be selected depending on the desired trade-off between development cost and improved performance/error coverage. Further modifications, such as wider queues or a longer issue window, may be considered to further reduce the performance penalties imposed by the increased number of micro ops.

Lockstep Checking for Vector Instructions

The example of FIG. 2 shows the utilization of a single vector lane to run in lockstep with scalar execution units and registers. Assuming that the execution of conventional vector instructions is prohibited in this form of scalar lockstep scheme, the underlying vector architecture does not require any form of predication. The use of a lockstep predicate $P_{lockstep}$ as illustrated in FIG. 2 merely reduces the number of undesired operations and therefore yields higher energy efficiency.

However, it is also possible to execute conventional vector instructions as part of a scalar & vector lockstep scheme. In this case, as shown in FIG. 9, main vector processing 170 can be checked by mapping the operands from a first subset of lanes to a second subset of lanes corresponding to checker processing 180, and running the main and checker processing within the respective subsets of lanes of the same vector instruction (or alternatively within respective subsets of lanes in different vector instructions).

In the vector lockstep case, further partitioning of vectors is provided to avoid interference between independent operations. For example, FIG. 9 illustrates the partitioning of an 8-element vector into:

Two elements reserved for conventional vector operations,
Two elements reserved for equivalent vector lockstep operations
One element reserved for scalar lockstep operations, and
3 unused elements It would also be possible for the conventional vector operations and the vector lockstep checking operations to operate on three 64-bit elements each. However, some processors may implement the vector processing unit such that the maximum vector length may need to be a multiple of a certain number of bits (e.g. 128 bits), and depending on the data element size (e.g. 64 bits), algorithms relying on this property may not support vectors holding an odd number of data elements. Hence, designs favouring lockstep operations may either discourage such algorithms and force the number of regular and lockstep lanes to be an even number, or provide a modified datapath to support odd multiples of elements.

The management of predicates to ensure isolation of the vector partitions introduced above can be performed as follows. The predicates used for particular instructions depend on their type:

Scalar lockstep operations use a scalar lockstep predicate value $P_{s,lockstep}$ which has a bit value of 1 in the scalar checking lane and bit value of 0 in other lanes;
    scalar lockstep operations include any vector operations executed in an effort to mirror scalar operations.
    The scalar lockstep predicate $P_{s,lockstep}$ prevents corruption of data held in the remaining vector elements, which would help enable sharing of the same vector register between lockstep checking instructions and regular vector instructions.
    However, unless $P_{s,lockstep}$ is supported by all vector instructions (either explicitly within the instruction encoding, or implicitly with the hardware introducing the predicate for the scalar lockstep vector instructions), a number of vector registers would need to be reserved for scalar lockstep operations to prevent pollution of other lanes used by regular vector instructions. This would increase vector register pressure and increase compiler complexity.

Unpredicated instructions use either $P_v\|P_{v,lockstep}$ (with 1s in the lanes used by the main vector processing and the lanes used to check the outcome of the main vector processing) or $!P_{s,lockstep}$ (the inverse of the scalar lockstep predicate, with 1s in all lanes other than the scalar checking lane).

Some vector architectures may primarily predicate certain floating point instructions, memory accesses and inter lane operations (e.g. reductions).

As vector lockstep operations are expected to mirror conventional vector operations, only the element reserved for scalar lockstep would need to be disabled to prevent data corruption.

Implementations that do not provide explicit or implicit means to predicate instructions for this purpose would reserve a number of vector registers exclusively for scalar lockstep operations.

Predicated instructions would use $P_v$ for conventional vector instructions (with 1s in the lanes reserved for main vector processing), or $P_{v,lockstep}$ for lockstep vector instructions (with 1s in the lanes reserved for the checking of the main vector processing).

For example, memory accesses can use $P_v$ to limit memory accesses to conventional vector operations:
Loads: perform inter lane move (or element wise shift+OR) to replicated loaded elements in vector lockstep partition
Stores: prior to store, perform inter lane comparison (or element wise shift+CMP) to ensure match between conventional and lockstep vector elements, branch to fault handler on mismatch
Inter lane operations (e.g. reductions or permutes) would isolate individual partitions, e.g. repeat same instruction once using $P_v$ and once using $P_{v,lockstep}$.

The complexity regarding the generation of predicates depends on the degree of ISA and hardware support provided (see above). Some vector architectures may support permute instructions required to perform the data movements required by the vector loads and stores described above. They can also supports means to mirror predicate bits corresponding to conventional vector elements into bits corresponding to lockstep vector elements. However, most architectures would not support the isolation of individual partitions as required by certain inter lane operations, so similar to the above described handling of inter-lane vector instruction, such inter lane predicate generating instructions would be executed twice (once using $P_v$ and once using $P_{v,lockstep}$).

Unless all instructions can be predicated, the partitions reserved for scalar and vector operations would be physically isolated, by using separate registers. One example of ISA support to resolving this may be to use an additional opcode bit per unpredicated vector instruction to select between the $P_{s,lockstep}$ and $!P_{v,lockstep}$ (the inverse of $P_{v,lockstep}$) with the register holding the predicate being predetermined by the architecture. A lockstep aware decoder would mitigate this opcode overhead by automatically selecting the corresponding predicate, e.g. $P_{s,lockstep}$ for scalar lockstep operations generated when decoding scalar instructions. The ISA or hardware modifications discussed above may also be used to improve the coverage of permanent faults, by ensuring that conventional and corresponding lockstep operations are executed in different functional units.

The detection of permanent faults for the execution of conventional vector instruction may require vector functional units to be split. In particular, a four element wide addition may be executed by using two FUs, each operating on two elements. Lockstep operations could then ensure execution in different FUs. While this would not necessarily impact performance of non-lockstep protected code, it may increase hardware complexity.

Recovery Operation for Intra-Core Lockstep

In the examples discussed above, when an error is detected based on the outcomes of main and checker processing operations, the error can be handled by aborting the erroneous thread of processing being performed. For example, an interrupt may be generated when an error is detected and then an interrupt handler may perform operations for terminating the erroneous thread of processing and rescheduling it later (or after terminating the thread, the interrupt handler may revert to an operating system which controls thread scheduling). However, this approach may have a significant performance impact since when the thread is rescheduled then the processing may need to be restarted from the very beginning of the thread and any forward progress made before the error was detected may be lost. Although software checkpointing, in which explicit store instructions are included in the program code to store intermediate results of processing to memory at various points during the program execution, could be used to preserve some forward progress between restarts, it has disadvantages due to increased software development costs and performance overheads.

FIG. 10 shows another embodiment in which the processing pipeline 2 has some microarchitectural features which enable it to use a recovery mode of error handling in which detected errors in the intra-core lockstep mode can be corrected and forward progress of the executed thread continued, without losing all previous progress made in that thread and without execution of instructions other than the thread's own main/checker instructions. Elements of FIG. 10 that are the same as in FIG. 1 are illustrated with the same reference numerals. For conciseness, the respective issue queues 46 and execution units 32 to 42 in the issue/execute stage 30 are not shown in FIG. 10, although they can be the same as in FIG. 1. Similarly, the vector registers 65, scalar registers 75 and predicate registers 70 are for conciseness shown simply as a single block of registers in FIG. 10, but nevertheless each of these types of registers can still be provided.

The example of FIG. 10 includes error handling circuitry 200, 210 which is responsive to the detection of a mismatch between information associated with a given checker operation and an associated main operation to trigger a recovery operation to correct an error and continue forward progress of the main processing on the execute stage 30. For example, the error handling circuitry may include result comparing circuitry 200 within the writeback stage 60 of the pipeline, for comparing results of a given checker operation and its associated main operation. While in the example of FIG. 1, the results of operations may be compared only on a store operation being stored to memory, in the example of FIG. 10 the results of additional operations (e.g. in some cases all pairs of checker operation and corresponding main operation) may be checked using the result comparing circuitry. To prevent potentially incorrect results being written to the registers 65, 75, 70, pairs of associated main and checker operations may be held in a commit buffer 202 until both results are available and the results have been determined to match. The commit buffer can also be referred to as a reorder buffer in an out of order pipeline. If results of a given pair of main and checker operations are determined to mismatch, then a recovery operation (comprising flushing at least the affected instructions from the pipeline and reissuing those instructions) can be triggered by the result comparing circuitry 200. Mechanisms to flush and reissue instructions may already be provided in the pipeline microarchitecture, for example for handling mispredictions made by a branch predictor 204 associated with the fetch stage 10, or for handling other forms of misspeculation, such as if load data loaded speculatively before the target load address is calculated turns out to be incorrect. Also, in some pipelines, exception handling may require some instructions to be flushed if an exception occurs at a given point of processing and the pipeline has already been filled with instructions beyond that point of processing. Hence, existing flush and reissue mechanisms could be reused by the result comparing circuitry 200 in order to recover from errors detected in the intra-core lockstep mode.

Another example of the error handling circuitry is stored value comparing circuitry 210 which may compare stored values associated with main and checker operations in order to detect errors caused by faults in storage elements such as the registers 65, 75, 70 or buffer or queue structures, such as a load/store queue 212. It will be appreciated that the load/store queue 212 is just one example of a possible queue or buffer structure.

As shown in FIG. 11, the stored value comparing circuitry 210 may use Error Detecting Codes (EDCs) to protect the storage data against faults. Modern DRAMs commonly rely on Error Correction Codes (ECCs) to improve their reliability. Safety focused and some commodity implementations extend the use of ECC through the memory hierarchy, even up to L1 caches. Although it would be possible to use ECCs for the protection of a processor's register files, the computation of ECCs and checking of whether an ECC matches its corresponding data value (which essentially repeats the computation of the ECC) is very expensive to implement in terms of circuit area and delay, and as use of ECCs on a register file would mean this delay is on the critical path of processing of most micro-operations executed by the pipeline, this means that ECCs are not practical for high-performance commercial processors.

Instead, the scheme proposed in FIG. 11 uses the property of the intra core lock-step mode that data corresponding to conventional instructions is replicated in multiple locations within the registers (either in separate vector register lanes, or with a vector lane replicating data in the scalar register file). Hence, it does not require computationally expensive ECC logic to restore data. Instead, cheaper error detection logic, such as parity bits or cyclic redundancy checks (CRC), may be used to identify which instance of a particular data was compromised before overwriting it with the intact copy.

FIG. 11 provides an example of how parity information may be assigned to lockstep (LS) elements of vector and predicate registers. Note that it is not necessary to compute this information for scalar registers or conventional vector elements as errors within those stored values would be detected when matching them against their LS equivalents.

In one example, the error detection mechanism operates as detailed below.
Prior to a register write:
  Compute parity information based on result of conventional (main processing) operation (likely to arrive prior to LS equivalent)
  Compare conventional and lockstep results:
    On mismatch, perform recovery operation comprising flush/reissue of in-flight instructions.
    On match, update registers with main/checker data values and parity information.
On a register read:
  Compare conventional and equivalent lockstep data (main and checker values)
    On match:
      forward data to respective main/checker operations
      Optional: compute parity information and check against conventional or lockstep element, and correct stored parity data on mismatch (corrects fault in stored parity information)
    On mismatch:
      Compute parity information and check against conventional or lockstep element
      Replace erroneous element with the other element
      Proceed as usual.

When vector lockstep elements for checker processing are provided to mirror a corresponding set of N vector elements used in the main processing (where N≥2), the overhead associated with the EDC for the vector lockstep elements can be reduced by computing a single EDC for the entire block of N vector lockstep elements (e.g. in the example of FIG. 11 a single parity bit corresponding to vector lockstep elements $V_2$ and $V_3$). Also a corresponding parity value 222 is computed from the predicate values corresponding to the block of vector lockstep elements, to allow for detection of errors in the predicate registers on a register read. It is not essential to compute a separate EDC for each vector lockstep element, as the single parity bit can be enough to determine whether a single bit has changed state in either the block of conventional vector elements ($V_0$, $V_1$) or the block of vector lockstep elements ($V_2$, $V_3$), since the likelihood of multiple bit flips occurring in the period between successive computations of the EDC is very low given the high frequency at which register writes occur. Alternatively, separate EDCs could be provided corresponding to each separate vector lockstep element, in which case there would be some additional robustness against multiple errors occurring in different elements of the conventional or lockstep elements.

The example above compares the conventional and lockstep data on a register read, before the data value is forwarded to the respective main/checker operations in the pipeline. This has the advantage that errors can be corrected simply by replacing the erroneous value with the other value of the pair, without requiring any instructions to be flushed/reissued.

An alternative would be to allow micro-operations to proceed with execution before the comparison of conventional/lockstep data has completed, speculating that no faults are present. Hence, the comparisons involved may be overlapped with the conventional data processing operations to hide their latency. In this case, on detection of a fault the recovery operation may comprise flushing and reissuing instructions as described for datapath errors, as the results of some already executed operations may not be correct. This approach can improve performance in the normal error-free case, at the expense of increased latency in recovering for an error when an error is detected.

While the examples above discuss use of parity codes as an example of error detecting codes, it will be appreciated that other types of error detecting codes could also be used. For example cyclic redundancy check (CRC) codes could be used. Parity bits (which indicate whether there are an even or odd number of 1s in the corresponding data value) may be computationally simpler, while more complex error detecting codes such as CRCs may provide fault coverage even in the case of multi-bit faults.

Note that in FIG. 11 the overhead associated with computing and checking the parity information can be reduced by associating the parity information (or other error detecting codes) with only one of the main and checker stored values associated with main and checker operations respectively. For example, in the case shown in FIG. 11 the parity information is stored only for the vector lockstep elements and the scalar lockstep element (i.e. the checker values) and is not computed for the conventional vector elements which represent the main values associated with the main processing, or for scalar values stored in the scalar registers 75.

FIG. 12 illustrates a similar mechanism covering a queue structure. As shown in part A) of FIG. 12, multiple redundant entries may be allocated to a queue (such as the load/store queue 212 or other queue or buffer structures within the pipeline, memory or other system components of the apparatus), and parity information or other EDCs may be assigned to one entry of each pair of redundant entries to enable detection of which entry is incorrect when the pair of redundant entries are found to mismatch on reading the buffer. While a single instance of parity information could cover all LS entries, it would require re-computation based on data held in all entries each time a single entry is written to. Providing one instance per entry restricts its computation effort to data held by the entry to be written to. As shown in part B) of FIG. 12, an alternative would be to allocate entries to the buffer 212 non-redundantly, but provide redundancy information (e.g. ECCs) per entry which enables errors to be corrected as well as detected, to trade off the overhead for the allocation of queue entries for LS purposes against increased control logic complexity and computational and/or storage overheads.

Status registers (e.g. program counter, condition flags or processor state/mode indicating bits, etc.) and buses that hold data not residing in registers or queues covered by the scheme described above, may be extended using similar techniques. For instance, a bus connecting the processor to nearby memory may transmit the same data twice and require the recipient to compare the received values. Alternatively, the bus may be extended to transfer redundant information in parallel to the conventional data. Structures that do not affect architectural state, such as the branch predictor 204, do not need to be covered. While errors in these structures may delay program execution, they do not impact functional correctness.

In addition to recovery from faults in data storage elements, we propose the introduction of microarchitectural features to enable recovery from faults in data processing elements, such as functional units (FUs) 32-42. In particular, we propose to use the information provided by redundant executions performed for intra core lockstep. By comparing conventional and lockstep (main and checker) results prior to commit, a fault inside a FU 32-42 that affects only one of those results may be detected. The processor may then recover by using circuitry typically already provided to handle misspeculations or exceptions. In particular, it may re-issue the affected instruction and all its dependents, or re-issue all currently in-flight instructions. Note that the rarity of these events permits hardware designers to optimize circuitry for minimal overheads in terms of area, complexity and energy consumption. The number of cycles required for recovery is not particularly relevant, as the overall recovery time is so much smaller compared to an abort & restart of the affected process. Besides the FUs themselves, this approach also covers the associated queues, such as issue queues 46 or a re-order buffer, to the extent which they affect the outcome of a result of related main/checker operations. For instance, a fault inside the renaming logic may result in two different results being computed by the conventional and the equivalent lockstep checker instruction. Following discovery, the replay mechanism may discard the invalid entries within the renaming tables and re-issue the corresponding instructions using the correct operand identifiers.

To enable intra core lockstep mode to recover from faults, pair identifying circuitry 214 by which conventional instructions can be associated with their corresponding lockstep equivalent prior to write-back is introduced to the writeback stage 60. FIGS. 13 to 15 show three alternative techniques for identifying pairs of related main/checker micro-operations: FIG. 13: Mark instruction or micro-operation pairs at the decode stage 20:

- Allocate matching pair identifiers to the related conventional and lockstep instructions at decode, with a unique pair ID for each different pair of operations.
- The number of pair ID code bits required is proportional to the maximum number of in-flight instructions divided by 2.
- The pair ID could be derived from an instructions commit (reorder) buffer ID used by the commit buffer 202 at the writeback stage 60, or could be an arbitrary identifier value.
- A default pair ID (e.g. zero) could be used for operations which do not have a lockstep equivalent.
- Prior to commit, check
  - If ID==0, non-LS instruction, commit as usual
  - Else, search window at head of commit buffer (re-order buffer or ROB) 202 for 2nd completed instruction with same ID; then match results as described above, and commit when both the pair of main/checker results are available and matching FIG. 14: Allocate instruction pairs next to each other in the commit buffer 202

- On decode, allocate instruction pairs to adjacent commit buffer 202 entries.
- Some instructions do not have a lockstep equivalent, so either:
  - allocate two independent non-LS micro-operations to a pair of entries, and provide each pair of entries with at least one bit distinguishing whether it relates to a pair of related main/checker operations or two independent operations; or
  - (as shown in the example of FIG. 14) leave one empty entry (NOP) in a pair of entries used for an instruction without a LS equivalent (e.g. branches, stores, or loads in embodiments which do not duplicate load micro-operations (other embodiments may handle loads with duplicated micro-operations as discussed above)).
- Instead of a NOP, decoder may insert other instructions, e.g. a check of the program counter against the expected value after a branch by replicating the underlying address computation inside a vector functional unit 42.

FIG. 15: Evaluate opcodes, operand IDs and predicates prior to commit

- no specific action at decode, instead writeback stage 60 has comparison circuitry for comparing information associated with each micro-operation to detect the related main/checker operations.

Use predicate information to distinguish conventional from LS instructions

Assume that conventional and LS instructions of similar type (ADDs, MULs, . . . ) operating on the same operands, and executed within the same timeframe correspond to each other Prior to commit, check fixed size window at head of ROB for corresponding pairs of instructions; if found, match results as described above Note that the methods described above may have to be modified to handle different degrees of micro-operations (uOps) between conventional scalar and corresponding vector LS instructions. For instance, the vector equivalent of a complex scalar instruction may be broken into multiple uOps to reduce implementation costs. Hence, the technique shown in FIG. 13 may assign the same pair IDs to the scalar instruction and only the final vector uOp (not other uOps of the same vector instruction). The technique shown in FIG. 14 may allocate the additional vector uOps to the commit buffer prior to the pair of corresponding scalar instruction and vector uOp. The technique shown in FIG. 14 may need to identify sequences of vector uOps to be part of a broken down instruction when looking for a corresponding scalar instruction.

The EDC and flush/reissue error recovery mechanisms described above are suitable for the detection and recovery from transient faults. However, a permanent fault may cause such error recovery mechanisms to enter an endless loop of fault detection and attempted recovery. Watch-dog timers or similar means could be used to detect such loops and terminate the trapped process. Depending on the source of the fault, the processor may then undergo a cold reset to drain residual charge and taken back into operation should the fault no longer show in subsequent testing.

To enable the detection of permanent faults without the need for external timers, the detection circuitry may be extended with flags or counters to track the number of recovery attempts. As shown in FIG. 16, an error counter may be provided for counting the number of times a recovery operation was attempted. When the number of attempts exceeds a given threshold, a permanent error handling response can be triggered. For example, the response taken for handling permanent errors may comprise an abort of the main processing, signalling of an alert event to the operating system, signalling an alert event to a second processor core, or transferring execution of the main processing to a second processor core. In particular:

Recovery from faults in data storage elements:
  Number and location of counters can be varied to trade off overhead against coverage, e.g. one counter for all faults, one counter per register file, one counter per register, etc.
  Incremented following mismatch on register read
  Optional:
    When an error is detected, instead of just overwriting a corrupted value while forwarding the corrected value to the processing units, the recovery mechanism may overwrite the value, then re-read it and check if the error persists, so that permanent faults may be detected earlier than if waiting for another operation to read the same register. A counter may still be used to track the number of re-tries.

Recovery from faults in data processing elements
  Again, number and location of counters to be chosen to trade off overhead against coverage, e.g. one for all faults, one per reorder buffer entry, etc.
  Incremented following mismatch prior to commit
  If any counter overflows:
    Stop (abort) processing of current thread
    Try to recover
      Automatic cold restart (may be required for single core machines, as recovery algorithm may not be able to execute on the faulty core)
      Send signal to second (uncompromised) core to handle recovery there (optional). Depending on the location of the error, it might be possible to store out the current (uncompromised) architectural state. A second core, or the recovered core may then continue execution from said state. This may require sufficient counters to identify the location of the fault and determine if architectural state was compromised. Depending on how and where this store-out would be handled, it might also need sufficient information in a fault status register, e.g. a handler running on the second processor core could check the faulty core's status register and decide if/how store-out should proceed.

The counter capacity (number of bits) can also be varied to trade off storage overhead against error recovery capability:
  If the number of bits is 1, the counter is treated like a flag, having simple control circuitry and low storage overhead. Hence, if an error in a given storage or datapath element occurs again having already performed the recovery operation once, an abort is triggered.
  If the number of bits is more than 1, this enables recovery from faults that persists for several cycles, for example charge from an alpha strike may drain over time.
  An alternative to increasing the number of counter bits can be to use a 1-bit flag but introduce a deliberate n cycle delay after fault detections to achieve a similar effect in enabling recovery from faults that persist for several cycles.

The counter values could be internal registers accessible only to the micro-architecture, but not software-readable. Alternatively, the counter values could be made software-readable, which could be useful for debugging purposes and/or to track fault distributions over time.

After a successful recovery from an error, counters can be reset. The counters may be reset after a fixed number of cycles without another fault. Local counters may also be reset after a successful recovery. For example, a counter corresponding to a specific register file may be reset after a faulty value was overwritten and successfully re-read. Similarly, a counter corresponding to a ROB entry may be reset after the corresponding instruction was successfully committed.

FIG. 17 is a flow diagram illustrating a method of performing data processing. At step 300 instructions are decoded by the decode stage 20 of the front end part of the pipeline. At step 302 the decoder determines whether the processor is currently operating in an intra-core lockstep mode. If not, then at step 304 the decoder controls the front end part of the pipeline to control the execute stage 30 to perform operations corresponding to the main processing only. For example the instruction decoder 20 may only issue micro-operations corresponding to the main processing and may not issue any checker operations. The method then returns to step 300 to continue decoding instructions.

On the other hand, if the core is currently in the intra-core lockstep mode (e.g. this may be determined based on a mode setting value within a configuration register) then at step 306 the decode stage 20 of the front end part of the pipeline controls the execute stage to perform both main processing and checker processing, where the checker processing corresponds to redundant operations which mirror corresponding operations of the main processing. It is not essential for every operation on the main processing to have a corresponding checker operation.

At step 308 the error handling circuitry 200, 210 detects whether there is a mismatch between any information associated with the checker and main operation. For example this could be a mismatch between results of the operations as detected by the result comparing circuitry 200 or a mismatch between stored values associated with the operations as detected by the stored value comparing circuitry 210. If no mismatch is detected, then processing continues and the method returns to step 300 to continue decoding instructions. If a mismatch is detected between information associated with checker and main operations then at step 310 a recovery operation is triggered to correct the error and continue forward progress of the main processing and the method then returns to step 300. At step 310 the recovery operation could for example comprise correcting the error in one stored value based on the value of its paired stored value, and/or flushing some instructions from the pipeline and reissuing them for execution.

While FIG. 17 shows the recovery operation being performed when a mismatch is detected at step 308, in some implementations which support different error handling modes there could be a selection, based on a mode setting bit, between a recovery mode used where the recovery operation is performed as at step 310, and an abort mode where instead the main processing thread is aborted when a mismatch is detected.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a processing pipeline comprising an execute stage to execute data processing in response to micro-operations, and at least one front end stage to control which micro-operations are issued to the execute stage in dependence on program instructions;
said processing pipeline having an intra-core lockstep mode of operation in which said at least one front end stage is configured to issue micro-operations for controlling the execute stage to perform main processing and checker processing, the checker processing comprising redundant operations corresponding to associated main operations of at least part of the main processing; and
error handling circuitry responsive to detection of a mismatch between information associated with a given checker operation and an associated main operation, to trigger a recovery operation to correct an error and continue forward progress of said main processing on said execute stage.

2. The apparatus according to claim 1, wherein the error handling circuitry comprises result comparing circuitry to detect said mismatch between results of the given checker operation and the associated main operation.

3. The apparatus according to claim 1, wherein the recovery operation comprises flushing from the processing pipeline at least one in-flight micro-operation corresponding to, or dependent on, said given checker operation and the associated main operation for which the mismatch was detected, and re-issuing said at least one in-flight micro-operation for execution by the execute stage.

4. The apparatus according to claim 1, wherein the recovery operation comprises flushing all in-flight micro-operations from the processing pipeline and reissuing the flushed micro-operations for execution by the execute stage.

5. The apparatus according to claim 1, wherein the processing pipeline comprises a writeback stage to defer writeback of a result of the given checker operation or the associated main operation to register state storage until both said given checker operation and the associated main operation have been executed and results of said given checker operation and the associated main operation are determined to match.

6. The apparatus according to claim 5, wherein the writeback stage comprises pair identifying circuitry to identify a pair of micro-operations corresponding to a checker operation and the associated main operation.

7. The apparatus according to claim 5, wherein said at least one front end stage is configured to allocate respective pair identifiers to micro-operations issued to the execute stage, with a given checker micro-operations corresponding to the given checker operation and an associated main micro-operation corresponding to the associated main operation allocated matching pair identifiers.

8. The apparatus according to claim 5, wherein the processing pipeline comprises a commit buffer comprising a plurality of pairs of buffer slots, each buffer slot to buffer an in-flight micro-operation until its result is written back to the register state storage by the writeback stage, and the processing pipeline is configured to allocate a given checker micro-operations corresponding to the given checker operation to a first buffer slot in a given one of said plurality of pairs of buffer slots and to allocate an associated main micro-operation corresponding to the associated main operation to a second buffer slot of said given one of said plurality of pairs of buffer slots.

9. The apparatus according to claim 6, wherein the pair identifying circuitry is configured to identify the pair of micro-operations based on a comparison of opcodes and operand identifiers associated with the pair of micro-operations.

10. The apparatus according to claim 1, comprising a plurality of registers, wherein on performing a load operation to load data from a data store to a target register in response to the main processing when operating in the intra-core lockstep mode, the processing pipeline is configured to also write the loaded data to a checker region of the target register or to another register for access by a checker operation corresponding to a main operation which accesses the target register.

11. The apparatus according to claim 1, wherein said error handling circuitry comprises stored value comparing circuitry to detect said mismatch between a pair of stored data values used for said given checker operation and the associated main operation respectively.

12. The apparatus according to claim 11, wherein said stored data values comprise architectural state stored in registers.

13. The apparatus according to claim 11, wherein said stored data values comprises control data stored in a queue structure.

14. The apparatus according to claim 11, wherein at least one of said pair of stored data values is associated with an error detecting code.

15. The apparatus according to claim 14, wherein when a mismatch is detected between the pair of stored data values, the error handling circuitry is configured to detect, based on the error detecting code associated with at least one of said pair of stored data values, which of the pair of stored data values is erroneous, and to correct the erroneous stored value using the other of the pair of stored data values.

16. The apparatus according to claim 15, wherein after the erroneous stored value is corrected, the stored value comparing circuitry is configured to repeat the detection of whether there is a mismatch between the pair of stored data values.

17. The apparatus according to claim 14, wherein when a match is detected between the pair of stored data values, the error handling circuitry is configured to trigger recomputation of the error detecting code associated with said at least one of said pair of stored data values.

18. The apparatus according to claim 14, wherein only one of the pair of stored data values is associated with the error detecting code.

19. The apparatus according to claim 1, wherein the error handling circuitry has:
  a recovery mode in which the error handling circuitry is responsive to detection of said mismatch to perform said recovery operation; and
  an abort mode in which the error handling circuitry is responsive to detection of said mismatch to abort processing of said main processing on said processing pipeline.

20. The apparatus according to claim 19, comprising a configuration storage element to store an error handling mode setting value indicative of whether the error handling circuitry is to operate in the recovery mode or the abort mode.

21. The apparatus according to claim 1, comprising an error counter to count a number of times the recovery operation is performed by the error handling circuitry.

22. The apparatus according to claim 21, wherein the error handling circuitry is configured to abort processing of said main processing on said processing pipeline when the error counter indicates that the recovery operation has been performed more than a threshold number of times.

23. The apparatus according to claim 21, comprising a plurality of processors, at least one of said processors comprising said processing pipeline and said error handling circuitry, wherein the error handling circuitry is configured to trigger switching of processing of said main processing to another processor when the error counter indicates that the recovery operation has been performed more than a threshold number of times.

24. The apparatus according to claim 21, wherein the error handling circuitry is configured to trigger a reset of the apparatus when the error counter indicates that the recovery operation has been performed more than a threshold number of times.

25. The apparatus according to claim 1, wherein the execute stage comprises vector processing circuitry to perform vector processing comprising a plurality of lanes of processing performed on vector operands comprising a plurality of data elements;
  said redundant operations comprise operations performed on at least one lane of the vector processing circuitry; and
  said main operations comprise operations performed on other lanes of the vector processing circuitry or scalar processing performed on scalar operands.

26. A data processing method comprising:
  executing data processing using an execute stage of a processing pipeline, in response to micro-operations issued in dependence on program instructions by at least one front end stage of the processing pipeline;
  wherein in an intra-core lockstep mode of operation, said at least one front end stage issues micro-operations for controlling the execute stage to perform main processing and checker processing, the checker processing comprising redundant operations corresponding to associated main operations of at least part of the main processing; and
  in response to detection of a mismatch between information associated with a given checker operation and an associated main operation, triggering a recovery operation to correct an error and continue forward progress of said main processing on said execute stage.

* * * * *